United States Patent
Bishop

(10) Patent No.: US 7,746,215 B1
(45) Date of Patent: Jun. 29, 2010

(54) RF TRANSACTIONS USING A WIRELESS READER GRID

(76) Inventor: Fred Bishop, 5511 W. Aster, Glendale, AZ (US) 85304

( * ) Notice: Subject to any disclaimer, the term of this patent is extended or adjusted under 35 U.S.C. 154(b) by 776 days.

(21) Appl. No.: 11/163,951

(22) Filed: Nov. 4, 2005

Related U.S. Application Data

(63) Continuation-in-part of application No. 10/340,352, filed on Jan. 10, 2003, application No. 11/163,951, which is a continuation-in-part of application No. 10/192,488, filed on Jul. 9, 2002, now Pat. No. 7,239,226.

(60) Provisional application No. 60/396,577, filed on Jul. 16, 2002, provisional application No. 60/304,216, filed on Jul. 10, 2001.

(51) Int. Cl.
- *H04Q 5/22* (2006.01)
- *G08B 13/14* (2006.01)
- *G08B 1/08* (2006.01)
- *G06K 5/00* (2006.01)
- *G06F 7/08* (2006.01)

(52) U.S. Cl. ............... 340/10.1; 340/572.1; 340/572.4; 340/539.16; 340/539.17; 340/539.18; 235/380; 235/381; 235/382

(58) Field of Classification Search ............... 340/10.1, 340/572.1–572.9, 539.16–539.19; 235/375–385
See application file for complete search history.

(56) References Cited

U.S. PATENT DOCUMENTS

| | | | |
|---|---|---|---|
| 3,376,661 A | 4/1968 | Hulett | |
| 3,914,762 A | 10/1975 | Klensch | |
| 4,066,873 A | 1/1978 | Schatz | |
| 4,206,965 A | 6/1980 | McGrew | |
| 4,303,904 A | 12/1981 | Chasek | |
| 4,318,554 A | 3/1982 | Anderson et al. | |
| 4,421,380 A | 12/1983 | McGrew | |
| 4,443,027 A | 4/1984 | McNelly et al. | |

(Continued)

FOREIGN PATENT DOCUMENTS

CH        689070        8/1998

(Continued)

OTHER PUBLICATIONS http://www.semiconductors.phillips.com/news/content/file_878.html, Apr. 7, 2003.

(Continued)

*Primary Examiner*—Daniel Wu
*Assistant Examiner*—Mark Rushing
(74) *Attorney, Agent, or Firm*—Snell & Wilmer L.L.P.

(57) ABSTRACT

The present invention discloses a radio frequency (RF) reader grid and method for facilitating transactions. The RF reader grid includes a transponder, a RFID reader, and a host RFID reader in communication with a merchant system. The secondary and host RFID readers communicate with one another via wireless, RF frequencies. The present invention also discloses a wireless grid that comprises non-radio frequency readers, such as magnetic stripe readers. In addition, a method for using a secondary RFID reader to perform a transaction is disclosed. The method includes the steps of initializing the secondary RFID reader, communication transaction information using the secondary RFID reader and processing the transaction information using a host RFID reader.

26 Claims, 13 Drawing Sheets

U.S. PATENT DOCUMENTS

| | | |
|---|---|---|
| 4,475,308 A | 10/1984 | Heise et al. |
| 4,558,211 A | 12/1985 | Berstein |
| 4,583,766 A | 4/1986 | Wessel |
| 4,589,686 A | 5/1986 | McGrew |
| 4,593,936 A | 6/1986 | Opel |
| 4,639,765 A | 1/1987 | dHont |
| 4,656,463 A | 4/1987 | Anders et al. |
| 4,663,518 A | 5/1987 | Borror et al. |
| 4,672,021 A | 6/1987 | Blumel et al. |
| 4,700,055 A | 10/1987 | Kashkashian, Jr. |
| 4,717,221 A | 1/1988 | McGrew |
| 4,736,094 A | 4/1988 | Yoshida |
| 4,739,328 A | 4/1988 | Koelle et al. |
| 4,744,497 A | 5/1988 | O'Neal |
| 4,795,894 A | 1/1989 | Sugimoto et al. |
| 4,829,690 A | 5/1989 | Andros |
| 4,837,422 A | 6/1989 | Dethloff et al. |
| 4,839,504 A | 6/1989 | Nakano |
| 4,849,617 A | 7/1989 | Ueda |
| 4,868,849 A | 9/1989 | Tamaoki |
| 4,884,507 A | 12/1989 | Levy |
| 4,918,432 A | 4/1990 | Pauley et al. |
| 4,961,142 A | 10/1990 | Elliott et al. |
| 4,984,270 A | 1/1991 | LaBounty |
| 4,998,753 A | 3/1991 | Wichael |
| 5,019,696 A * | 5/1991 | Chang et al. ............... 235/436 |
| 5,023,782 A | 6/1991 | Lutz et al. |
| 5,053,774 A | 10/1991 | Schuermann et al. |
| 5,068,894 A | 11/1991 | Hoppe |
| 5,099,226 A | 3/1992 | Andrews |
| 5,101,200 A | 3/1992 | Swett |
| 5,125,356 A | 6/1992 | Galante |
| 5,197,140 A | 3/1993 | Balmer |
| 5,198,647 A | 3/1993 | Mizuta |
| 5,206,488 A | 4/1993 | Teicher |
| 5,208,110 A | 5/1993 | Smith et al. |
| 5,212,777 A | 5/1993 | Gove et al. |
| 5,221,838 A | 6/1993 | Gutman et al. |
| 5,222,282 A | 6/1993 | Sukonnik et al. |
| 5,226,989 A | 7/1993 | Sukonnik |
| 5,234,624 A | 8/1993 | Bauer et al. |
| 5,239,654 A | 8/1993 | IngSimmons et al. |
| 5,247,304 A | 9/1993 | dHont |
| 5,257,656 A | 11/1993 | McLeroy |
| 5,259,649 A | 11/1993 | Shomron |
| 5,274,392 A | 12/1993 | dHont et al. |
| 5,276,311 A | 1/1994 | Hennige |
| 5,285,100 A | 2/1994 | Byatt |
| 5,288,978 A | 2/1994 | Iijima |
| 5,304,789 A | 4/1994 | Lob et al. |
| 5,305,002 A | 4/1994 | Holodak et al. |
| 5,308,121 A | 5/1994 | Gunn |
| 5,326,964 A | 7/1994 | Risser |
| 5,329,617 A | 7/1994 | Asal |
| 5,331,138 A | 7/1994 | Saroya |
| 5,339,447 A | 8/1994 | Balmer |
| 5,349,357 A | 9/1994 | Schurmann et al. |
| 5,351,052 A | 9/1994 | dHont et al. |
| 5,359,522 A | 10/1994 | Ryan |
| 5,365,551 A | 11/1994 | Snodgrass et al. |
| 5,371,896 A | 12/1994 | Gove et al. |
| 5,373,303 A | 12/1994 | dHont |
| 5,397,881 A | 3/1995 | Mannik |
| 5,407,893 A | 4/1995 | Koshizuka et al. |
| 5,408,243 A | 4/1995 | dHont |
| 5,410,649 A | 4/1995 | Gove |
| 5,412,192 A | 5/1995 | Hoss |
| 5,428,363 A | 6/1995 | dHont |
| 5,453,747 A | 9/1995 | dHont et al. |
| 5,471,592 A | 11/1995 | Gove et al. |
| 5,477,040 A | 12/1995 | Lalonde |
| 5,479,494 A | 12/1995 | Clitherow |
| 5,485,510 A | 1/1996 | Colbert |
| 5,488,376 A | 1/1996 | Hurta et al. |
| 5,489,411 A | 2/1996 | Jha et al. |
| 5,489,897 A * | 2/1996 | Inoue ................... 340/870.39 |
| 5,489,908 A | 2/1996 | Orthmann et al. |
| 5,490,079 A | 2/1996 | Sharpe et al. |
| 5,491,483 A | 2/1996 | dHont |
| 5,491,484 A | 2/1996 | Schuermann |
| 5,491,715 A | 2/1996 | Flaxl |
| 5,493,312 A | 2/1996 | Knebelkamp |
| 5,497,121 A | 3/1996 | dHont |
| 5,500,651 A | 3/1996 | Schuermann |
| 5,503,434 A | 4/1996 | Gunn |
| 5,513,525 A | 5/1996 | Schurmann |
| 5,519,381 A | 5/1996 | Marsh et al. |
| 5,522,083 A | 5/1996 | Gove et al. |
| 5,525,992 A | 6/1996 | Froschermeier |
| 5,525,994 A | 6/1996 | Hurta et al. |
| 5,528,222 A | 6/1996 | Moskowitz et al. |
| 5,530,232 A | 6/1996 | Taylor |
| 5,533,656 A | 7/1996 | Bonaldi |
| 5,534,857 A | 7/1996 | Laing et al. |
| 5,541,604 A | 7/1996 | Meier |
| 5,543,798 A | 8/1996 | Schuermann |
| 5,544,246 A | 8/1996 | Mandelbaum et al. |
| 5,548,291 A | 8/1996 | Meier et al. |
| 5,550,536 A | 8/1996 | Flaxl |
| 5,550,548 A | 8/1996 | Schuermann |
| 5,552,789 A | 9/1996 | Schuermann |
| 5,555,877 A | 9/1996 | Lockwood et al. |
| 5,557,279 A | 9/1996 | dHont |
| 5,557,516 A | 9/1996 | Hogan |
| 5,561,430 A | 10/1996 | Knebelkamp |
| 5,563,582 A | 10/1996 | dHont |
| 5,569,187 A | 10/1996 | Kaiser |
| 5,569,897 A | 10/1996 | Masuda |
| 5,572,226 A | 11/1996 | Tuttle |
| 5,577,109 A | 11/1996 | Stimson et al. |
| 5,578,808 A | 11/1996 | Taylor |
| 5,581,630 A | 12/1996 | Bonneau, Jr. |
| 5,585,787 A | 12/1996 | Wallerstein |
| 5,590,038 A | 12/1996 | Pitroda |
| 5,592,150 A | 1/1997 | dHont |
| 5,592,405 A | 1/1997 | Gove et al. |
| 5,592,767 A | 1/1997 | Treske |
| 5,594,233 A | 1/1997 | Kenneth et al. |
| 5,594,448 A | 1/1997 | dHont |
| 5,597,534 A | 1/1997 | Kaiser |
| 5,600,175 A | 2/1997 | Orthmann |
| 5,602,538 A | 2/1997 | Orthmann et al. |
| 5,602,919 A | 2/1997 | Hurta et al. |
| 5,604,342 A | 2/1997 | Fujioka |
| 5,606,520 A | 2/1997 | Gove et al. |
| 5,606,594 A | 2/1997 | Register et al. |
| 5,607,522 A | 3/1997 | McDonnell |
| 5,608,406 A | 3/1997 | Eberth et al. |
| 5,608,778 A | 3/1997 | Partridge, III |
| 5,613,146 A | 3/1997 | Gove et al. |
| 5,619,207 A | 4/1997 | dHont |
| 5,621,396 A | 4/1997 | Flaxl |
| 5,621,411 A | 4/1997 | Hagl et al. |
| 5,621,412 A | 4/1997 | Sharpe et al. |
| 5,625,366 A | 4/1997 | dHont |
| 5,625,370 A | 4/1997 | dHont |
| 5,625,695 A | 4/1997 | MRaihi et al. |
| 5,629,981 A | 5/1997 | Nerlikar |
| 5,638,080 A | 6/1997 | Orthmann et al. |
| 5,640,002 A | 6/1997 | Ruppert et al. |
| 5,646,607 A | 7/1997 | Schuermann et al. |
| 5,649,118 A | 7/1997 | Carlisle et al. |
| 5,657,388 A | 8/1997 | Weiss |
| 5,660,319 A | 8/1997 | Falcone et al. |

| | | | | | | |
|---|---|---|---|---|---|---|
| 5,673,106 | A | 9/1997 | Thompson | 5,870,915 A | 2/1999 | dHont |
| 5,675,342 | A | 10/1997 | Sharpe | 5,878,215 A | 3/1999 | Kling et al. |
| 5,686,920 | A | 11/1997 | Hurta et al. | 5,878,337 A | 3/1999 | Joao et al. |
| 5,691,731 | A | 11/1997 | vanErven | 5,878,403 A | 3/1999 | DeFrancesco et al. |
| 5,692,132 | A | 11/1997 | Hogan | 5,880,675 A | 3/1999 | Trautner |
| 5,694,596 | A | 12/1997 | Campbell | 5,881,272 A | 3/1999 | Balmer |
| 5,696,913 | A | 12/1997 | Gove et al. | 5,883,377 A | 3/1999 | Chapin, Jr. |
| 5,698,837 | A | 12/1997 | Furuta | 5,883,810 A | 3/1999 | Franklin et al. |
| 5,699,528 | A | 12/1997 | Hogan | 5,887,266 A | 3/1999 | Heinonen et al. |
| 5,700,037 | A | 12/1997 | Keller | 5,890,137 A | 3/1999 | Koreeda |
| 5,701,127 | A | 12/1997 | Sharpe | 5,898,783 A | 4/1999 | Rohrbach |
| 5,704,046 | A | 12/1997 | Hogan | 5,903,830 A | 5/1999 | Joao et al. |
| 5,705,798 | A | 1/1998 | Tarbox | 5,905,798 A | 5/1999 | Nerlikar et al. |
| 5,705,852 | A | 1/1998 | Orihara et al. | 5,912,678 A | 6/1999 | Saxena et al. |
| 5,710,421 | A | 1/1998 | Kokubu | 5,914,472 A | 6/1999 | Foladare et al. |
| 5,715,399 | A | 2/1998 | Bezos | 5,917,168 A | 6/1999 | Nakamura et al. |
| 5,721,781 | A | 2/1998 | Deo et al. | 5,920,628 A | 7/1999 | Indeck et al. |
| 5,725,098 | A | 3/1998 | Seifert et al. | 5,923,734 A | 7/1999 | Taskett |
| 5,729,053 | A | 3/1998 | Orthmann | 5,923,884 A | 7/1999 | Peyret et al. |
| 5,729,236 | A | 3/1998 | Flaxl | 5,924,080 A | 7/1999 | Johnson |
| 5,731,957 | A | 3/1998 | Brennan | 5,929,801 A | 7/1999 | Aslanidis et al. |
| 5,732,579 | A | 3/1998 | dHont et al. | 5,930,767 A | 7/1999 | Reber et al. |
| 5,745,571 | A | 4/1998 | Zuk | 5,931,917 A | 8/1999 | Nguyen et al. |
| 5,748,137 | A | 5/1998 | dHont | 5,933,624 A | 8/1999 | Balmer |
| 5,748,737 | A | 5/1998 | Daggar | 5,943,624 A | 8/1999 | Fox et al. |
| 5,751,220 | A * | 5/1998 | Ghaffari ............... 340/825.21 | 5,945,653 A | 8/1999 | Walker et al. |
| 5,758,195 | A | 5/1998 | Balmer | 5,948,116 A | 9/1999 | Aslanidis et al. |
| 5,761,306 | A | 6/1998 | Lewis | 5,950,174 A | 9/1999 | Brendzel |
| 5,761,493 | A | 6/1998 | Blakeley et al. | 5,950,179 A | 9/1999 | Buchanan et al. |
| 5,768,609 | A | 6/1998 | Gove et al. | 5,953,512 A | 9/1999 | Cai et al. |
| 5,769,457 | A | 6/1998 | Warther | 5,953,710 A | 9/1999 | Fleming |
| 5,770,843 | A | 6/1998 | Rose et al. | 5,955,717 A | 9/1999 | Vanstone |
| 5,773,812 | A | 6/1998 | Kreft | 5,955,951 A | 9/1999 | Wischerop et al. |
| 5,774,882 | A | 6/1998 | Keen et al. | 5,955,969 A | 9/1999 | dHont |
| 5,777,903 | A | 7/1998 | Piosenka | 5,956,024 A | 9/1999 | Strickland et al. |
| 5,778,067 | A | 7/1998 | Jones et al. | 5,956,693 A | 9/1999 | Geerlings |
| 5,785,680 | A | 7/1998 | Niezink et al. | 5,956,699 A | 9/1999 | Wong et al. |
| 5,789,733 | A | 8/1998 | Jachimowicz et al. | 5,960,416 A | 9/1999 | Block |
| 5,792,337 | A | 8/1998 | Padovani et al. | 5,963,924 A | 10/1999 | Williams et al. |
| 5,793,324 | A | 8/1998 | Aslanidis et al. | 5,969,318 A | 10/1999 | Mackenthun |
| 5,794,095 | A | 8/1998 | Thompson | 5,970,148 A | 10/1999 | Meier |
| 5,797,060 | A | 8/1998 | Thompson | 5,970,470 A | 10/1999 | Walker |
| 5,797,085 | A | 8/1998 | Buek et al. | 5,974,238 E | 10/1999 | Chase, Jr. |
| 5,797,133 | A | 8/1998 | Jones et al. | RE36,365 E | 11/1999 | Levine et al. |
| 5,798,709 | A | 8/1998 | Flaxl | 5,978,840 A | 11/1999 | Nguyen et al. |
| 5,809,142 | A | 9/1998 | Hurta et al. | 5,979,757 A | 11/1999 | Tracy et al. |
| 5,809,288 | A | 9/1998 | Balmer | 5,982,293 A | 11/1999 | Everett et al. |
| 5,809,633 | A | 9/1998 | Mundigl et al. | 5,983,200 A | 11/1999 | Slotznick |
| 5,825,007 | A | 10/1998 | Jesadanont | 5,983,208 A | 11/1999 | Haller |
| 5,825,302 | A | 10/1998 | Stafford | 5,987,140 A | 11/1999 | Rowney et al. |
| 5,826,077 | A | 10/1998 | Blakeley et al. | 5,987,155 A | 11/1999 | Dunn et al. |
| 5,826,243 | A | 10/1998 | Musmanno et al. | 5,987,498 A | 11/1999 | Athing et al. |
| 5,828,044 | A | 10/1998 | Jun et al. | 5,988,510 A | 11/1999 | Tuttle |
| 5,834,756 | A | 11/1998 | Gutman et al. | 5,989,950 A | 11/1999 | Wu |
| 5,838,257 | A | 11/1998 | Lambropoulos | 5,991,608 A | 11/1999 | Leyten |
| 5,838,720 | A | 11/1998 | Morelli | 5,991,748 A | 11/1999 | Taskett |
| 5,841,364 | A | 11/1998 | Hagl et al. | 5,991,750 A | 11/1999 | Watson |
| 5,842,088 | A | 11/1998 | Thompson | 5,996,076 A | 11/1999 | Rowney et al. |
| 5,844,218 | A | 12/1998 | Kawan et al. | 6,002,438 A | 12/1999 | Hocevar et al. |
| 5,844,230 | A | 12/1998 | Lalonde | 6,002,767 A | 12/1999 | Kramer |
| 5,845,267 | A | 12/1998 | Ronen | 6,003,014 A | 12/1999 | Lee et al. |
| 5,851,149 | A | 12/1998 | Xidos et al. | 6,005,942 A | 12/1999 | Chan et al. |
| 5,852,812 | A | 12/1998 | Reeder | 6,006,216 A | 12/1999 | Griffin et al. |
| 5,854,891 | A | 12/1998 | Postlewaite et al. | 6,011,487 A | 1/2000 | Plocher |
| 5,857,152 | A | 1/1999 | Everett | 6,012,049 A | 1/2000 | Kawan |
| 5,858,006 | A | 1/1999 | Van der AA et al. | 6,012,636 A | 1/2000 | Smith |
| 5,859,419 | A | 1/1999 | Wynn | 6,014,645 A | 1/2000 | Cunningham |
| 5,859,587 | A | 1/1999 | Alicot et al. | 6,016,476 A | 1/2000 | Maes et al. |
| 5,859,779 | A | 1/1999 | Giordano et al. | 6,016,484 A | 1/2000 | Williams et al. |
| 5,864,306 | A | 1/1999 | Dwyer et al. | 6,018,717 A | 1/2000 | Lee et al. |
| 5,864,323 | A | 1/1999 | Berthon | 6,021,943 A | 2/2000 | Chastain |
| 5,867,100 | A | 2/1999 | dHont | 6,024,286 A | 2/2000 | Bradley et al. |
| 5,870,031 | A | 2/1999 | Kaiser et al. | 6,029,149 A | 2/2000 | Dykstra et al. |

| | | | | | | |
|---|---|---|---|---|---|---|
| 6,029,175 | A | 2/2000 | Chow | 6,179,206 B1 | 1/2001 | Matsumori |
| 6,029,892 | A | 2/2000 | Miyake | 6,181,287 B1 | 1/2001 | Beigel |
| 6,032,136 | A | 2/2000 | Brake, Jr. et al. | 6,185,307 B1 | 2/2001 | Johnson |
| 6,036,100 | A | 3/2000 | Asami | 6,188,994 B1 | 2/2001 | Egendorf |
| 6,038,292 | A | 3/2000 | Thomas | 6,189,787 B1 | 2/2001 | Dorf |
| 6,038,584 | A | 3/2000 | Balmer | 6,192,255 B1 | 2/2001 | Lewis et al. |
| 6,044,360 | A | 3/2000 | Picciallo | 6,195,006 B1 | 2/2001 | Bowers et al. |
| 6,047,888 | A | 4/2000 | Dethloff | 6,198,728 B1 | 3/2001 | Hulyalkar et al. |
| 6,050,494 | A | 4/2000 | Song et al. | 6,198,875 B1 | 3/2001 | Edenson et al. |
| 6,052,675 | A | 4/2000 | Checchio | 6,202,927 B1 | 3/2001 | Bashan et al. |
| 6,061,344 | A | 5/2000 | Wood, Jr. | 6,205,151 B1 | 3/2001 | Quay et al. |
| 6,064,320 | A | 5/2000 | dHont et al. | 6,206,293 B1 | 3/2001 | Gutman et al. |
| 6,065,675 | A | 5/2000 | Teicher | 6,213,390 B1 | 4/2001 | Oneda |
| 6,068,184 | A | 5/2000 | Barnett | 6,213,391 B1 | 4/2001 | Lewis |
| 6,068,193 | A | 5/2000 | Kreft | 6,215,437 B1 | 4/2001 | Schurmann et al. |
| 6,070,003 | A | 5/2000 | Gove et al. | 6,216,219 B1 | 4/2001 | Cai et al. |
| 6,072,870 | A | 6/2000 | Nguyen et al. | 6,219,439 B1 | 4/2001 | Burger |
| 6,073,112 | A | 6/2000 | Geerlings | 6,220,510 B1 | 4/2001 | Everett et al. |
| 6,073,236 | A | 6/2000 | Kusakabe et al. | D442,627 S | 5/2001 | Webb et al. |
| 6,073,840 | A | 6/2000 | Marion | D442,629 S | 5/2001 | Webb et al. |
| 6,076,296 | A | 6/2000 | Schaeffer | 6,223,984 B1 | 5/2001 | Renner et al. |
| 6,078,888 | A | 6/2000 | Johnson, Jr. | 6,224,109 B1 | 5/2001 | Yang |
| 6,078,908 | A | 6/2000 | Schmitz | 6,226,382 B1 | 5/2001 | MRaihi et al. |
| RE36,788 | E | 7/2000 | Mansvelt et al. | 6,227,447 B1 | 5/2001 | Campisano |
| 6,085,976 | A | 7/2000 | Sehr | 6,230,270 B1 | 5/2001 | Laczko, Sr. |
| 6,088,683 | A | 7/2000 | Jalili | 6,232,917 B1 | 5/2001 | Baumer et al. |
| 6,088,686 | A | 7/2000 | Walker et al. | 6,233,683 B1 | 5/2001 | Chan et al. |
| 6,088,755 | A | 7/2000 | Kobayashi et al. | 6,237,848 B1 | 5/2001 | Everett |
| 6,089,611 | A | 7/2000 | Blank | 6,239,675 B1 | 5/2001 | Flaxl |
| 6,092,057 | A | 7/2000 | Zimmerman et al. | 6,240,187 B1 | 5/2001 | Lewis |
| 6,095,567 | A | 8/2000 | Buell | 6,240,989 B1 | 6/2001 | Masoud |
| 6,098,879 | A | 8/2000 | Terranova | 6,248,199 B1 | 6/2001 | Smulson |
| 6,099,043 | A | 8/2000 | Story | 6,250,554 B1 | 6/2001 | Leo et al. |
| 6,100,804 | A | 8/2000 | Brady et al. | 6,250,557 B1 | 6/2001 | Forslund et al. |
| 6,101,174 | A | 8/2000 | Langston | 6,257,486 B1 | 7/2001 | Teicher et al. |
| 6,101,477 | A * | 8/2000 | Hohle et al. .................. 705/1 | 6,259,769 B1 | 7/2001 | Page |
| 6,102,162 | A | 8/2000 | Teicher | 6,260,026 B1 | 7/2001 | Tomida et al. |
| 6,102,672 | A | 8/2000 | Woollenweber | 6,260,088 B1 | 7/2001 | Gove et al. |
| 6,104,281 | A | 8/2000 | Heinrich et al. | 6,263,316 B1 | 7/2001 | Khan et al. |
| 6,105,008 | A | 8/2000 | Davis et al. | 6,264,106 B1 | 7/2001 | Bridgelall |
| 6,105,013 | A | 8/2000 | Curry et al. | 6,266,754 B1 | 7/2001 | Laczko, Sr. et al. |
| 6,105,865 | A | 8/2000 | Hardesty | 6,267,292 B1 | 7/2001 | Walker et al. |
| 6,107,920 | A | 8/2000 | Eberhart et al. | 6,273,335 B1 | 8/2001 | Sloan |
| 6,108,641 | A | 8/2000 | Kenna et al. | 6,282,522 B1 | 8/2001 | Davis et al. |
| 6,109,525 | A | 8/2000 | Blomqvist et al. | D447,515 S | 9/2001 | Faenza, Jr. et al. |
| 6,112,152 | A | 8/2000 | Tuttle | 6,286,763 B1 | 9/2001 | Reynolds et al. |
| 6,112,984 | A | 9/2000 | Snavely | 6,289,324 B1 | 9/2001 | Kawan |
| 6,115,040 | A | 9/2000 | Bladow et al. | 6,290,137 B1 | 9/2001 | Kiekhaefer |
| 6,115,360 | A | 9/2000 | Quay et al. | 6,293,462 B1 | 9/2001 | Gangi |
| 6,116,423 | A | 9/2000 | Troxtell, Jr. et al. | 6,295,522 B1 | 9/2001 | Boesch |
| 6,116,505 | A | 9/2000 | Withrow | 6,297,727 B1 | 10/2001 | Nelson, Jr. |
| 6,118,189 | A | 9/2000 | Flaxl | 6,304,223 B1 | 10/2001 | Hilton et al. |
| 6,121,544 | A | 9/2000 | Petsinger | 6,309,098 B1 | 10/2001 | Wong |
| 6,123,223 | A | 9/2000 | Watkins | 6,315,193 B1 | 11/2001 | Hogan |
| 6,129,274 | A | 10/2000 | Suzuki | 6,315,195 B1 | 11/2001 | Ramacchandran |
| 6,130,623 | A | 10/2000 | MacLellan et al. | 6,317,721 B1 | 11/2001 | Hurta et al. |
| 6,133,834 | A | 10/2000 | Eberth et al. | 6,317,755 B1 | 11/2001 | Rakers et al. |
| 6,138,913 | A | 10/2000 | Cyr et al. | 6,318,636 B1 | 11/2001 | Reynolds et al. |
| 6,138,917 | A | 10/2000 | Chapin, Jr. | 6,323,566 B1 | 11/2001 | Meier |
| 6,141,651 | A | 10/2000 | Riley et al. | 6,325,285 B1 | 12/2001 | Baratelli |
| 6,144,916 | A | 11/2000 | Wood et al. | 6,325,293 B1 | 12/2001 | Moreno |
| 6,144,948 | A | 11/2000 | Walker et al. | 6,326,934 B1 | 12/2001 | Kinzie |
| 6,157,824 | A | 12/2000 | Bailey | 6,327,573 B1 | 12/2001 | Walker et al. |
| 6,163,771 | A | 12/2000 | Walker et al. | 6,329,920 B1 | 12/2001 | Morrison et al. |
| 6,167,236 | A | 12/2000 | Kaiser et al. | 6,331,972 B1 | 12/2001 | Harris et al. |
| 6,168,083 | B1 | 1/2001 | Berger et al. | 6,332,134 B1 | 12/2001 | Foster |
| 6,173,269 | B1 | 1/2001 | Solokl et al. | 6,339,384 B1 | 1/2002 | Valdes-Rodriguez |
| 6,173,897 | B1 | 1/2001 | Halpern | 6,342,844 B1 | 1/2002 | Rozin |
| 6,173,898 | B1 | 1/2001 | Mande | 6,353,420 B1 | 3/2002 | Chung |
| 6,173,899 | B1 | 1/2001 | Rozin | 6,353,811 B1 | 3/2002 | Weissman |
| 6,177,859 | B1 | 1/2001 | Tuttle et al. | 6,364,208 B1 | 4/2002 | Stanford et al. |
| 6,177,860 | B1 | 1/2001 | Cromer et al. | 6,367,011 B1 | 4/2002 | Lee et al. |
| 6,179,205 | B1 | 1/2001 | Sloan | 6,374,245 B1 | 4/2002 | Park |

| Patent | Date | Name |
|---|---|---|
| 6,377,034 B1 | 4/2002 | Ivanov |
| 6,378,073 B1 | 4/2002 | Davis et al. |
| 6,386,444 B1 | 5/2002 | Sullivan |
| 6,388,533 B2 | 5/2002 | Swoboda |
| 6,390,375 B2 | 5/2002 | Kayanakis |
| 6,400,272 B1 | 6/2002 | Holtzman et al. |
| 6,402,026 B1 | 6/2002 | Schwier |
| 6,402,028 B1 | 6/2002 | Graham, Jr. et al. |
| 6,404,341 B1 | 6/2002 | Reid |
| 6,406,935 B2 | 6/2002 | Kayanakis et al. |
| 6,411,611 B1 | 6/2002 | Van der Tuijn |
| 6,415,978 B1 | 7/2002 | McAllister |
| 6,421,650 B1 | 7/2002 | Goetz et al. |
| 6,422,462 B1 | 7/2002 | Cohen |
| 6,422,464 B1 | 7/2002 | Terranova |
| 6,422,472 B1 | 7/2002 | Thevenot et al. |
| 6,424,029 B1 | 7/2002 | Giesler |
| RE37,822 E | 8/2002 | Anthonyson |
| 6,427,910 B1 | 8/2002 | Barnes et al. |
| 6,434,159 B1 | 8/2002 | Woodward et al. |
| 6,435,415 B1 | 8/2002 | Catte |
| 6,438,235 B2 | 8/2002 | Sims, III |
| 6,439,455 B1 | 8/2002 | Everett et al. |
| 6,442,532 B1 | 8/2002 | Kawan |
| 6,445,794 B1 | 9/2002 | Shefi |
| 6,457,996 B1 | 10/2002 | Shih |
| 6,466,804 B1 | 10/2002 | Pecen et al. |
| 6,471,127 B2 | 10/2002 | Pentz et al. |
| 6,473,500 B1 | 10/2002 | Risafi et al. |
| 6,480,100 B1 | 11/2002 | Frieden et al. |
| 6,480,101 B1 | 11/2002 | Kelly et al. |
| 6,480,869 B1 | 11/2002 | Fujioka |
| 6,481,621 B1 | 11/2002 | Herrendoerfer et al. |
| 6,481,632 B2 | 11/2002 | Wentker et al. |
| 6,483,427 B1 | 11/2002 | Werb |
| 6,483,477 B1 | 11/2002 | Plonka |
| 6,484,937 B1 | 11/2002 | Devaux et al. |
| 6,490,443 B1 | 12/2002 | Freeny, Jr. |
| 6,491,229 B1 | 12/2002 | Berney |
| 6,494,367 B1 | 12/2002 | Zacharias |
| 6,494,380 B2 | 12/2002 | Jarosz |
| 6,505,772 B1 | 1/2003 | Mollett et al. |
| 6,507,762 B1 | 1/2003 | Amro et al. |
| 6,510,983 B2 | 1/2003 | Horowitz et al. |
| 6,510,998 B1 | 1/2003 | Stanford et al. |
| 6,513,015 B2 | 1/2003 | Ogasawara |
| 6,520,542 B2 | 2/2003 | Thompson et al. |
| 6,527,176 B2 * | 3/2003 | Baric ........................ 235/381 |
| 6,529,880 B1 * | 3/2003 | McKeen et al. ............... 705/17 |
| 6,535,726 B1 | 3/2003 | Johnson |
| 6,546,373 B1 | 4/2003 | Cerra |
| 6,547,133 B1 | 4/2003 | DeVries, Jr. et al. |
| 6,549,912 B1 | 4/2003 | Chen |
| 6,560,581 B1 | 5/2003 | Fox et al. |
| 6,575,361 B1 | 6/2003 | Graves et al. |
| 6,577,229 B1 | 6/2003 | Bonneau et al. |
| 6,578,768 B1 | 6/2003 | Binder et al. |
| 6,581,839 B1 | 6/2003 | Lasch et al. |
| 6,587,835 B1 | 7/2003 | Treyz et al. |
| 6,588,660 B1 | 7/2003 | Buescher et al. |
| 6,589,119 B1 | 7/2003 | Orus et al. |
| 6,598,024 B1 | 7/2003 | Walker et al. |
| 6,608,551 B1 | 8/2003 | Anderson et al. |
| 6,608,995 B1 | 8/2003 | Kawasaki et al. |
| 6,609,655 B1 | 8/2003 | Harrell |
| 6,623,039 B2 | 9/2003 | Thompson et al. |
| 6,626,356 B2 | 9/2003 | Davenport et al. |
| 6,628,961 B1 | 9/2003 | Ho et al. |
| 6,631,849 B2 | 10/2003 | Blossom |
| 6,636,833 B1 | 10/2003 | Flitcroft et al. |
| 6,650,887 B2 | 11/2003 | McGregor et al. |
| 6,665,405 B1 | 12/2003 | Lenstra |
| 6,671,358 B1 | 12/2003 | Seidman et al. |
| 6,674,786 B1 | 1/2004 | Nakamura et al. |
| 6,679,427 B1 | 1/2004 | Kuroiwa |
| 6,681,328 B1 | 1/2004 | Harris et al. |
| 6,684,269 B2 | 1/2004 | Wagner |
| 6,685,089 B2 | 2/2004 | Terranova et al. |
| 6,686,847 B1 | 2/2004 | Mittler |
| 6,687,714 B1 | 2/2004 | Kogen et al. |
| 6,690,930 B1 | 2/2004 | Dupre |
| 6,693,513 B2 | 2/2004 | Tuttle |
| 6,704,608 B1 | 3/2004 | Azuma |
| 6,705,530 B2 | 3/2004 | Kiekhaefer |
| 6,708,375 B1 | 3/2004 | Johnson |
| 6,711,262 B1 | 3/2004 | Watanen |
| 6,725,202 B1 | 4/2004 | Hurta et al. |
| 6,732,919 B2 | 5/2004 | Macklin et al. |
| 6,732,936 B1 | 5/2004 | Kiekhaefer |
| 6,742,120 B1 | 5/2004 | Markakis et al. |
| 6,747,546 B1 | 6/2004 | Hikita et al. |
| 6,749,123 B2 | 6/2004 | Lasch et al. |
| 6,760,581 B2 | 7/2004 | Dutta |
| 6,764,014 B2 | 7/2004 | Lasch et al. |
| 6,769,718 B1 | 8/2004 | Warther et al. |
| 6,771,981 B1 | 8/2004 | Zalewski et al. |
| 6,786,400 B1 | 9/2004 | Bucci |
| 6,789,012 B1 | 9/2004 | Childs et al. |
| 6,789,733 B2 | 9/2004 | Terranova et al. |
| 6,793,141 B1 | 9/2004 | Graham |
| 6,799,726 B2 | 10/2004 | Stockhammer |
| 6,830,193 B2 | 12/2004 | Tanaka |
| 6,851,617 B2 | 2/2005 | Saint et al. |
| 6,853,087 B2 | 2/2005 | Neuhaus et al. |
| 6,853,894 B1 | 2/2005 | Kolls |
| 6,857,566 B2 | 2/2005 | Wankmueller |
| 6,859,672 B2 | 2/2005 | Roberts et al. |
| 6,895,310 B1 | 5/2005 | Kolls |
| 6,915,277 B1 | 7/2005 | Manchester et al. |
| 6,924,729 B1 | 8/2005 | Aschauer et al. |
| 6,925,565 B2 | 8/2005 | Black |
| D509,243 S | 9/2005 | Hunter, Jr. et al. |
| 6,978,369 B2 | 12/2005 | Wheeler et al. |
| 6,978,933 B2 | 12/2005 | Yap et al. |
| 6,994,262 B1 | 2/2006 | Warther |
| 7,004,385 B1 | 2/2006 | Douglass |
| 7,006,993 B1 | 2/2006 | Cheong et al. |
| 7,069,444 B2 | 6/2006 | Lowensohn et al. |
| 7,070,112 B2 | 7/2006 | Beenau et al. |
| 7,093,767 B2 | 8/2006 | Faenza et al. |
| 7,103,575 B1 | 9/2006 | Linehan |
| 7,119,659 B2 | 10/2006 | Bonalle et al. |
| 7,136,835 B1 | 11/2006 | Flitcroft et al. |
| 7,172,112 B2 | 2/2007 | Bonalle et al. |
| 7,184,747 B2 | 2/2007 | Bogat |
| 7,287,695 B2 | 10/2007 | Wankmueller |
| 7,363,505 B2 | 4/2008 | Black |
| 7,419,093 B1 | 9/2008 | Blackson et al. |
| 2001/0013542 A1 | 8/2001 | Horowitz et al. |
| 2001/0024157 A1 | 9/2001 | Hansmann et al. |
| 2001/0030238 A1 | 10/2001 | Arisawa |
| 2001/0034565 A1 | 10/2001 | Leatherman |
| 2001/0034640 A1 * | 10/2001 | Chaum ........................ 705/12 |
| 2001/0034720 A1 | 10/2001 | Armes et al. |
| 2001/0039617 A1 | 11/2001 | Buhrlen et al. |
| 2002/0005774 A1 | 1/2002 | Rudolph et al. |
| 2002/0011519 A1 | 1/2002 | Shults |
| 2002/0014952 A1 * | 2/2002 | Terranova ................... 340/5.61 |
| 2002/0019807 A1 | 2/2002 | Halpern |
| 2002/0028704 A1 | 3/2002 | Bloomfield et al. |
| 2002/0035548 A1 | 3/2002 | Hogan et al. |
| 2002/0040935 A1 | 4/2002 | Weyant |
| 2002/0040936 A1 | 4/2002 | Wentker et al. |
| 2002/0043566 A1 | 4/2002 | Goodman et al. |
| 2002/0052839 A1 | 5/2002 | Takatori |
| 2002/0062284 A1 | 5/2002 | Kawan |

| | | |
|---|---|---|
| 2002/0074398 A1 | 6/2002 | Lancos et al. |
| 2002/0077837 A1 | 6/2002 | Krueger et al. |
| 2002/0077895 A1 | 6/2002 | Howell |
| 2002/0077992 A1 | 6/2002 | Tobin |
| 2002/0079367 A1 | 6/2002 | Montani |
| 2002/0092914 A1 | 7/2002 | Pentz et al. |
| 2002/0095343 A1 | 7/2002 | Barton et al. |
| 2002/0095389 A1 | 7/2002 | Gaines |
| 2002/0095587 A1 | 7/2002 | Doyle et al. |
| 2002/0097144 A1 | 7/2002 | Collins et al. |
| 2002/0107007 A1 | 8/2002 | Gerson |
| 2002/0107742 A1 | 8/2002 | Magill |
| 2002/0109580 A1 | 8/2002 | Shreve et al. |
| 2002/0111210 A1 | 8/2002 | Luciano, Jr. et al. |
| 2002/0113082 A1 | 8/2002 | Leatherman et al. |
| 2002/0116274 A1 | 8/2002 | Hind et al. |
| 2002/0120584 A1 | 8/2002 | Hogan et al. |
| 2002/0126010 A1 | 9/2002 | Trimble et al. |
| 2002/0131567 A1 | 9/2002 | Maginas |
| 2002/0138425 A1 | 9/2002 | Shimizu et al. |
| 2002/0138438 A1 | 9/2002 | Bardwell |
| 2002/0140542 A1 | 10/2002 | Prokoski et al. |
| 2002/0145043 A1 | 10/2002 | Challa et al. |
| 2002/0147913 A1 | 10/2002 | Lun Yip |
| 2002/0148892 A1 | 10/2002 | Bardwell |
| 2002/0152123 A1 | 10/2002 | Giordano et al. |
| 2002/0165931 A1 | 11/2002 | Greer et al. |
| 2002/0166891 A1 | 11/2002 | Stoutenburg et al. |
| 2002/0176522 A1 | 11/2002 | Fan |
| 2002/0178063 A1 | 11/2002 | Gravelle et al. |
| 2002/0178369 A1 | 11/2002 | Black |
| 2002/0179704 A1 | 12/2002 | Deaton |
| 2002/0185543 A1 | 12/2002 | Pentz et al. |
| 2002/0188501 A1 | 12/2002 | Lefkowith |
| 2002/0190125 A1 | 12/2002 | Stockhammer |
| 2002/0192856 A1 | 12/2002 | Halope et al. |
| 2002/0193102 A1 | 12/2002 | Hyyppa et al. |
| 2002/0194303 A1 | 12/2002 | Suila et al. |
| 2002/0194503 A1 | 12/2002 | Faith et al. |
| 2002/0196963 A1 | 12/2002 | Bardwell |
| 2003/0005310 A1 | 1/2003 | Shinzaki |
| 2003/0009382 A1 | 1/2003 | DArbelott et al. |
| 2003/0014307 A1 | 1/2003 | Heng |
| 2003/0014357 A1 | 1/2003 | Chrisekos et al. |
| 2003/0014891 A1 | 1/2003 | Nelms et al. |
| 2003/0018532 A1 | 1/2003 | Dudek et al. |
| 2003/0018893 A1 | 1/2003 | Hess |
| 2003/0025600 A1 | 2/2003 | Blanchard |
| 2003/0028481 A1 | 2/2003 | Flitcroft et al. |
| 2003/0033697 A1 | 2/2003 | Hicks et al. |
| 2003/0037851 A1 | 2/2003 | Hogganvik |
| 2003/0046228 A1 | 3/2003 | Berney |
| 2003/0054836 A1 | 3/2003 | Michot |
| 2003/0055727 A1 | 3/2003 | Walker et al. |
| 2003/0057226 A1 | 3/2003 | Long |
| 2003/0057278 A1 | 3/2003 | Wong |
| 2003/0069828 A1 | 4/2003 | Blazey et al. |
| 2003/0069846 A1 | 4/2003 | Marcon |
| 2003/0112972 A1 | 6/2003 | Hattick et al. |
| 2003/0115126 A1 | 6/2003 | Pitroda |
| 2003/0120554 A1 | 6/2003 | Hogan et al. |
| 2003/0121969 A1 | 7/2003 | Wankmueller |
| 2003/0130820 A1 | 7/2003 | Lane, III |
| 2003/0132284 A1 | 7/2003 | Reynolds et al. |
| 2003/0140228 A1 | 7/2003 | Binder |
| 2003/0149662 A1 | 8/2003 | Shore |
| 2003/0160074 A1 | 8/2003 | Pineda |
| 2003/0163699 A1 | 8/2003 | Pailles et al. |
| 2003/0167207 A1 | 9/2003 | Berardi et al. |
| 2003/0177347 A1 | 9/2003 | Schneier et al. |
| 2003/0183689 A1 | 10/2003 | Swift et al. |
| 2003/0183695 A1 | 10/2003 | Labrec et al. |
| 2003/0183699 A1 | 10/2003 | Masui |
| 2003/0187786 A1 | 10/2003 | Swift et al. |
| 2003/0187787 A1 | 10/2003 | Freund |
| 2003/0187790 A1 | 10/2003 | Swift et al. |
| 2003/0187796 A1 | 10/2003 | Swift et al. |
| 2003/0195037 A1 | 10/2003 | Vuong et al. |
| 2003/0195842 A1 | 10/2003 | Reece |
| 2003/0195843 A1 | 10/2003 | Matsuda et al. |
| 2003/0200184 A1 | 10/2003 | Dominguez et al. |
| 2003/0218066 A1 | 11/2003 | Fernandes et al. |
| 2003/0220876 A1 | 11/2003 | Burger et al. |
| 2003/0222153 A1 | 12/2003 | Pentz et al. |
| 2003/0225623 A1 | 12/2003 | Wankmueller |
| 2003/0225713 A1 | 12/2003 | Atkinson et al. |
| 2003/0227550 A1 | 12/2003 | Manico et al. |
| 2003/0230514 A1 | 12/2003 | Baker |
| 2003/0233334 A1 | 12/2003 | Smith |
| 2004/0010462 A1 | 1/2004 | Moon et al. |
| 2004/0011877 A1 | 1/2004 | Reppermund |
| 2004/0015451 A1 | 1/2004 | Sahota et al. |
| 2004/0016796 A1 | 1/2004 | Hanna et al. |
| 2004/0026518 A1 | 2/2004 | Kudo et al. |
| 2004/0029569 A1 | 2/2004 | Khan et al. |
| 2004/0030601 A1 | 2/2004 | Pond et al. |
| 2004/0039814 A1 | 2/2004 | Crabtree et al. |
| 2004/0039860 A1 | 2/2004 | Mills et al. |
| 2004/0044627 A1 | 3/2004 | Russell et al. |
| 2004/0046034 A1 | 3/2004 | Ey Yamani et al. |
| 2004/0127256 A1 | 7/2004 | Goldthwaite et al. |
| 2004/0139021 A1 | 7/2004 | Reed et al. |
| 2004/0160310 A1 | 8/2004 | Chen et al. |
| 2004/0176071 A1 | 9/2004 | Gehrmann et al. |
| 2004/0177045 A1 | 9/2004 | Brown |
| 2004/0180657 A1 | 9/2004 | Yaqub et al. |
| 2004/0193676 A1 | 9/2004 | Marks |
| 2004/0235450 A1 | 11/2004 | Rosenberg |
| 2004/0236680 A1 | 11/2004 | Luoffo et al. |
| 2005/0004921 A1 | 1/2005 | Beenau et al. |
| 2005/0017068 A1 | 1/2005 | Zalewski et al. |
| 2005/0023157 A1 | 2/2005 | Logan |
| 2005/0033686 A1 | 2/2005 | Peart et al. |
| 2005/0035192 A1 | 2/2005 | Bonalle et al. |
| 2005/0035847 A1 | 2/2005 | Bonalle et al. |
| 2005/0038718 A1 | 2/2005 | Barnes et al. |
| 2005/0040272 A1 | 2/2005 | Argumedo et al. |
| 2005/0045718 A1 | 3/2005 | Bortolin et al. |
| 2005/0065872 A1 | 3/2005 | Moebs et al. |
| 2005/0083180 A1* | 4/2005 | Horwitz et al. ............ 340/10.4 |
| 2005/0113137 A1 | 5/2005 | Rodriguez et al. |
| 2005/0121512 A1 | 6/2005 | Wankmueller |
| 2005/0122209 A1 | 6/2005 | Black |
| 2005/0125312 A1 | 6/2005 | Dearing et al. |
| 2005/0127164 A1 | 6/2005 | Wankmueller |
| 2005/0149358 A1 | 7/2005 | Sacco et al. |
| 2005/0171905 A1 | 8/2005 | Wankmueller |
| 2005/0207002 A1 | 9/2005 | Liu et al. |
| 2005/0221853 A1 | 10/2005 | Silvester |
| 2006/0178937 A1 | 8/2006 | Rau et al. |

FOREIGN PATENT DOCUMENTS

| | | |
|---|---|---|
| CH | 689680 | 8/1999 |
| DE | 2847756 | 5/1980 |
| DE | 29702538 | 4/1997 |
| EP | 0 181 770 | 5/1986 |
| EP | 0 343 829 A2 | 11/1989 |
| EP | 0 354 817 B1 | 2/1990 |
| EP | 0 358 525 A2 | 3/1990 |
| EP | 0 368 570 A2 | 5/1990 |
| EP | 0 388 090 B1 | 9/1990 |
| EP | 0 424 726 A1 | 10/1990 |
| EP | 0 403 134 A2 | 12/1990 |
| EP | 0 411 602 A2 | 2/1991 |
| EP | 0 473 998 A2 | 3/1992 |

| | | |
|---|---|---|
| EP | 0 481 388 B1 | 4/1992 |
| EP | 0 531 605 B1 | 3/1993 |
| EP | 0 552 047 B1 | 7/1993 |
| EP | 0 560 318 B1 | 9/1993 |
| EP | 0 568 185 B1 | 11/1993 |
| EP | 0 657 297 B1 | 6/1995 |
| EP | 0 721 850 A2 | 7/1996 |
| EP | 0780839 | 6/1997 |
| EP | 0 789 316 B1 | 8/1997 |
| EP | 0 866 420 A2 | 9/1998 |
| EP | 0 894 620 A1 | 2/1999 |
| EP | 0 916 519 | 5/1999 |
| EP | 0 933 717 A2 | 8/1999 |
| EP | 0949595 | 10/1999 |
| EP | 0 956 818 A1 | 11/1999 |
| EP | 0 959 440 A2 | 11/1999 |
| EP | 0 984 404 A2 | 3/2000 |
| EP | 1 016 947 A2 | 7/2000 |
| EP | 1 039 403 A2 | 9/2000 |
| EP | 1 104 909 A2 | 6/2001 |
| EP | 1 113 387 A2 | 7/2001 |
| EP | 1 199 684 A2 | 4/2002 |
| EP | 1 251 450 A1 | 10/2002 |
| EP | 1345146 | 9/2003 |
| GB | 1 371 254 | 10/1974 |
| GB | 2 108 906 A | 5/1983 |
| GB | 2 240 948 A | 8/1991 |
| GB | 2347537 | 9/2000 |
| GB | 2350021 | 11/2000 |
| JP | 62-43774 | 3/1987 |
| JP | 62-264999 | 11/1987 |
| JP | 63-071794 | 4/1988 |
| JP | 63-098689 | 4/1988 |
| JP | 63-72721 | 5/1988 |
| JP | 63-175987 | 7/1988 |
| JP | 64-004934 | 1/1989 |
| JP | 64-087395 | 3/1989 |
| JP | 64-087396 | 3/1989 |
| JP | 64-087397 | 3/1989 |
| JP | 02-130737 | 5/1990 |
| JP | 02-252149 | 10/1990 |
| JP | 03-290 780 | 12/1991 |
| JP | 42-005596 | 7/1992 |
| JP | 04-303692 | 10/1992 |
| JP | 05-069689 | 3/1993 |
| JP | 05-254283 | 10/1993 |
| JP | 06-183187 | 7/1994 |
| JP | 06-191137 | 7/1994 |
| JP | 06-234287 | 8/1994 |
| JP | 07-173358 | 7/1995 |
| JP | 07-205569 | 8/1995 |
| JP | 08-244385 | 9/1996 |
| JP | 08-324163 | 12/1996 |
| JP | 09-050505 | 2/1997 |
| JP | 09-052240 | 2/1997 |
| JP | 09-274640 | 10/1997 |
| JP | 10-129161 | 5/1998 |
| JP | 10-289296 | 10/1998 |
| JP | 10302160 | 11/1998 |
| JP | 10-334206 | 12/1998 |
| JP | 10-340231 | 12/1998 |
| JP | 11-175640 | 7/1999 |
| JP | 11-227367 | 8/1999 |
| JP | 11-353425 | 12/1999 |
| JP | 2000-1109 A | 1/2000 |
| JP | 2000-015288 A | 1/2000 |
| JP | 2000-40181 A | 2/2000 |
| JP | 2000-048153 | 2/2000 |
| JP | 2000-67312 A | 3/2000 |
| JP | 2000-17729 | 6/2000 |
| JP | 2000-163538 | 6/2000 |
| JP | 2000-194799 | 7/2000 |
| JP | 2000-207641 A | 7/2000 |
| JP | 2000-222176 | 8/2000 |
| JP | 2000-252854 | 9/2000 |
| JP | 2001-5931 A | 1/2001 |
| JP | 2001-405506 | 4/2001 |
| JP | 2001-134536 | 5/2001 |
| JP | 2001-160105 | 6/2001 |
| JP | 2001-283122 A | 10/2001 |
| JP | 2001-315475 | 11/2001 |
| JP | 2002-109584 | 4/2002 |
| JP | 2002-133335 | 5/2002 |
| JP | 2002-157530 | 5/2002 |
| JP | 2002-274087 | 9/2002 |
| JP | 2003-288646 | 10/2003 |
| WO | WO 81/00776 | 3/1981 |
| WO | WO 89/03760 | 5/1989 |
| WO | WO 90/08661 | 8/1990 |
| WO | WO 92/16913 | 10/1992 |
| WO | WO 95/32919 | 12/1995 |
| WO | WO 95/35546 | 12/1995 |
| WO | WO 96/18972 | 6/1996 |
| WO | WO 97/40459 | 10/1997 |
| WO | WO 99/03057 A1 | 1/1999 |
| WO | WO 99/12136 | 3/1999 |
| WO | WO 99/14055 | 3/1999 |
| WO | WO 99/27492 | 6/1999 |
| WO | WO 99/40548 | 8/1999 |
| WO | WO 99/47983 | 9/1999 |
| WO | WO 00/10144 A1 | 2/2000 |
| WO | WO 00/38088 A1 | 6/2000 |
| WO | WO 01/04825 A1 | 1/2001 |
| WO | WO 01/15098 A1 | 3/2001 |
| WO | WO 01/43095 A2 | 6/2001 |
| WO | WO 01/55955 | 8/2001 |
| WO | WO 01/72224 A1 | 10/2001 |
| WO | WO 01/77856 A1 | 10/2001 |
| WO | WO 01/80473 A2 | 10/2001 |
| WO | WO 01/86535 A1 | 11/2001 |
| WO | WO 01/90962 A1 | 11/2001 |
| WO | WO 01/95243 A2 | 12/2001 |
| WO | WO 02/01485 A1 | 1/2002 |
| WO | WO 02/13134 A2 | 2/2002 |
| WO | WO 02/21903 A1 | 3/2002 |
| WO | WO 02/063545 A2 | 8/2002 |
| WO | WO 02/065246 A2 | 8/2002 |
| WO | WO 02/065404 A2 | 8/2002 |
| WO | WO 02/069221 A1 | 9/2002 |
| WO | WO 02/073512 A1 | 9/2002 |
| WO | WO 02/086665 | 10/2002 |
| WO | WO 02/091281 | 11/2002 |
| WO | WO 02/097575 | 12/2002 |
| WO | WO 02/101670 | 12/2002 |
| WO | WO 03/007623 | 1/2003 |

OTHER PUBLICATIONS http://www.palowireless.com/infotooth/whatis.asp, Apr. 28, 2003.
http://www.palowireless.com/infotooth/tutorial.asp, Apr. 28, 2003.
http://www.palowireless.com/infotooth/tutorial/profiles.asp, Apr. 28, 2003.
http://www.palowireless.com/infotooth/tutorial/radio.asp, Apr. 28, 2003.
http://www.polowireless.com/infotooth/tutorial/baseband.asp, Apr. 28, 2003.
http://www.palowireless.com/infotooth/tutorial/lmp.asp, Apr. 28, 2003.
http://www.palowireless.com/infotooth/tutorial/hci.asp, Apr. 28, 2003.
http://www.palowireless.com/infotooth/tutorial/l2cap.asp, Apr. 28, 2003.
http://www.palowireless.com/infotooth/tutorial/rfcomm.asp, Apr. 28, 2003.
http://www.palowireless.com/infotooth/tutorial/sdp.asp, Apr. 28, 2003.

http://www.palowireless.com/infotooth/tutorialk1_gap.asp, Apr. 28, 2003.

"Sony, Phillips to Test RFID Platform", RFID Journal, May 8, 2003.

USBanker, Article 5, 1995, http://www.banking.com/us-banker/art5.

"What's New: Timex Watch Features Speedpass System", http://www.speedpass.com/news/article.jsp?id=51 (1 page).

"Physical Reality: A Second Look", Ken Sharp, Senior Technical Editor, http://www.idsystems.com/reader/1999_03/phys0399_pt2/phys0399_pt2.htm (6 pages).

"'Magic Wands' to Speed Mobile Sales", BobBrewin, Jan. 15, 2001, http://www.computerworld.com/mobiletopics/mobile/story/1,10801,563300.html (4 pages).

"Mobile Speedpass Goes Global as Mobil Singapore Rolls Out Asia's First RFID-Based Pay-At-The-Pump System", Press Release, Apr. 5, 1999, http://www.ti.com/tiris/docs/news_releases/rel12.htm (3 pages).

"Speedpass Unleashed", Jun. 4, 2002 http://www.cardweb.com/cardtrak/news/cf2_20a_97.html (2 pages).

Prophecy Central Update #9, Oct. 10, 1997, http://www.bible-prophecy.com/pcu9.htm (5 pages).

International Newsletter of the TI RFID Group, Issue 20, 2000 (12 pages).

"CES: Microsoft's SPOT Technology has Humble Origins", by James Niccolai, Jan. 10, 2003, http://archive.inforworld.com/articles/hn/xml/03/01/10/030110hnspot.xml?s=IDGNS (3 pages).

"Microsoft: See SPOT Run on Your Wrist", by Richard Shim, Jun. 5, 2003, http://news.com.com/2100-1041_3-1013442.html?tag=fd_top (1 page).

"Networking: Microsoft SPOT", by Jeremy A. Kaplan, Jul. 1, 2003, http://www.pcmag.com/print_article/0,3048,a=43561,00.asp (2 pages).

"Microsoft Launches Smart Personal Object Technology Initiative", Press Release from COMDEX Fall 2002, Nov. 17, 2002, http://www.Microsoft.com/presspass/features/2002/nov02/11-17SPOT.asp (4 pages).

"Bank Extends RFID Payment Pilot: Bank of America will continue to test its QuickWave RFID payment card for another three months", RFID Journal, Jan. 23, 2003.

"MasterCard to Test RFID Card: Pilot will test whether consumers, merchants and credit card issuers value "contactless" payments", RFID Journal, Dec. 20, 2002.

"Vendors Target Amusement Parks: Protecting children and enabling cashless payments make RFID an appealing option for the entertainment industry", RFID Journal, Nov. 27, 2002.

"Inside's Next-Gen Smart Card: The French company plans to introduce an RFID card that uses a 16-bit microprocessor and new encryption technology", RFID Journal, Oct. 29, 2002.

"Sony, Philips Creating RFID Link: Consumer electronics giants are jointly developing a new RFID standard for payments and for communication between devices", RFID Journal, Sep. 17, 2002.

"Japan Gets Digital Ticket System: A national ticket seller and phone company are teaming up to create an electronic ticket", RFID Journal, Aug. 31, 2002.

"Security for Wireless Java: NTRU, a startup that offers security software, has relased of Java version of its NTRU encryption algorithm", RFID Journal, Jun. 27, 2002.

"Making RFID Payments Ubiquitous: Philips and Visa want people to be able to pay for goods and services anywhere by using RFID chips embedded in the phones and other devices", RFID Journal, Jun. 2, 20003.

"RFID Smart Cards Gain Ground: The convenience of contactless transactions is driving widespread adoption of contactless smart cards", RFID Journal, Apr. 9, 2003.

"TI Embarces Prox Card Standard: Texas Instruments ISO 14443 payment platform promises faster data transfer rates and more security", RFID Journal, Mar. 6, 2003.

"Multiple Frequency Transponders: Volume production of dual-band RFID chips begins", Frontline Solutions, Jul. 16, 2003.

Functional Specification, Standard Card IC MF1 IC S50, Philips Semiconductors, Product Specification Rev. 5.1 May 2001.

Financial Technology International Bulletin, V14, n1, p4, Sep. 1996.

Green, Thomas C., "American Express Offers temporary CC numbers for the web," Sep. 9, 2000, The Register, www.theregister.c.uk/c.

CNN.com, U.S. News, "American Express to offer disposable credit card numbers," Sep. 8, 2000, Associated Press, www.cnn.c.

American Express, "Private Payments (SM) ; A New Level of Security from American Express," American Express Website, Cards.

Martin, Zack, "One-Time Numbers Stop Web Hackers From Pilfering Data," 01/01, Card Marketing, Thomson Financial, www.c rdf rum.c.

The Dollar Stretcher, "Disposable Credit Card Numbers," 01/01, CardRatings.org, www.stretcher.c.

ISO/IEC 7816-6:1996(E)—First Edition—May 15, 1996.

ISO/IEC 7816-4:1995(E)—First Edition—Sep. 1, 1995.

* cited by examiner

RF TRANSACTIONS USING A WIRELESS READER GRID

CROSS-REFERENCE TO RELATED APPLICATIONS

This application is a continuation-in-part of U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS," filed on Jul. 9, 2002 (issued as U.S. Pat. No. 7,239,226 on Jul. 3, 2007), which is a non-provisional of U.S. Provisional Patent Application No. 60/304,216, filed Jul. 10, 2001. This application is also a continuation-in-part of U.S. patent application Ser. No. 10/340,352, entitled "AUTHORIZING PAYMENT SUBSEQUENT TO RF TRANSACTIONS," filed Jan. 10, 2003, which is a non-provisional of U.S. Provisional Patent Application No. 60/396,577, filed Jul. 16, 2002. All of the foregoing applications are incorporated herein by reference.

FIELD OF INVENTION

This invention generally relates to using Radio Frequency Identification (RFID)-enabled readers in a wireless grid format, and more particularly, to a system and method for configuring multiple RFID readers in a wireless grid to facilitate communication by the readers at a single merchant POS location.

BACKGROUND OF INVENTION

Like barcode and voice data entry, RFID is a contactless information acquisition technology. RFID systems are wireless, and are usually extremely effective in hostile environments where conventional acquisition methods fail. RFID has established itself in a wide range of markets, such as, for example, the high-speed reading of railway containers, tracking moving objects such as livestock or automobiles, and retail inventory applications. As such, RFID technology has become a primary focus in automated data collection, identification and analysis systems worldwide.

Of late, companies are increasingly embodying RFID data acquisition technology in a fob or tag for use in completing financial transactions. A typical fob includes a transponder and is ordinarily a self-contained device which may be contained on any portable form factor. In some instances, a battery may be included with the fob to power the transponder. In which case the internal circuitry of the fob (including the transponder) may draw its operating power from the battery power source. Alternatively, the fob may exist independent of an internal power source. In this instance the internal circuitry of the fob (including the transponder) may gain its operating power directly from an RF interrogation signal. U.S. Pat. No. 5,053,774, issued to Schuermann, describes a typical transponder RF interrogation system which may be found in the prior art. The Schuermann patent describes in general the powering technology surrounding conventional transponder structures. U.S. Pat. No. 4,739,328 discusses a method by which a conventional transponder may respond to an RF interrogation signal. Other typical modulation techniques which may be used include, for example, ISO/IEC 14443 and the like.

In the conventional fob powering technologies used, the fob is typically activated upon presenting the fob to an interrogation signal. In this regard, the fob may be activated irrespective of whether the user desires such activation. Inadvertent presentation of the fob may result in initiation and completion of an unwanted transaction. Thus, a fob system is needed which allows the fob user to control activation of the fob to limit transactions being undesirably completed.

Currently, many commercial establishments have only a few POS terminals for use in conducting a transaction. Further, a clerk or other person is usually needed to facilitate processing the transaction. For example, at a restaurant, the waiter must take a diner's credit card and run it through a credit card terminal to process the transaction. Often, this process can be slow and inefficient.

Thus, a need exists for a faster, more efficient way to expedite transactions. Further still, a need exists to facilitate a transaction without using a clerk or other third party.

Where companies have multiple POS terminals, implementing network connections for each of the terminals often is expensive and may require significant manual labor to install cable. Changes in location of POS terminals may also be expensive because changes in the network layout may be required. Each POS terminal at a grocery store may be expensive and require significant operating memory and bandwidth for data transmission.

Thus, a need also exists for inexpensive transaction processing devices that can be quickly added to a network by using already existing transaction processing devices to connect to the network.

SUMMARY OF INVENTION

The invention involves a radio frequency reader grid and method for facilitating transactions. An exemplary RF reader grid comprises a transponder system, a secondary RFID readers, and a host RFID reader in communication with a merchant system. The secondary and host RFID readers are configured to communicate with one another via wireless, RF frequencies. In one embodiment, the secondary RFID readers are configured to perform only a portion of the functions that the host RFID reader performs. In another embodiment, the patent discloses a wireless grid that comprises non-radio frequency readers, such as magnetic stripe readers.

In yet another embodiment, a method for using a secondary RFID reader to facilitate a transaction is disclosed. The method includes the steps of initializing the secondary RFID reader, using the secondary RFID reader to communicate transaction information to and from a user, communicating the transaction information from a secondary RFID reader to a host RFID reader, and processing the transaction information by communicating between a host RFID reader and a merchant or third party.

These features and other advantages of the system and method, as well as the structure and operation of various exemplary embodiments of the system and method, are described below.

BRIEF DESCRIPTION OF THE DRAWINGS

The accompanying drawings, wherein like numerals depict like elements, illustrate exemplary embodiments of the present invention, and together with the description, serve to explain the principles of the invention. In the drawings.

DETAILED DESCRIPTION

Figure 1A:
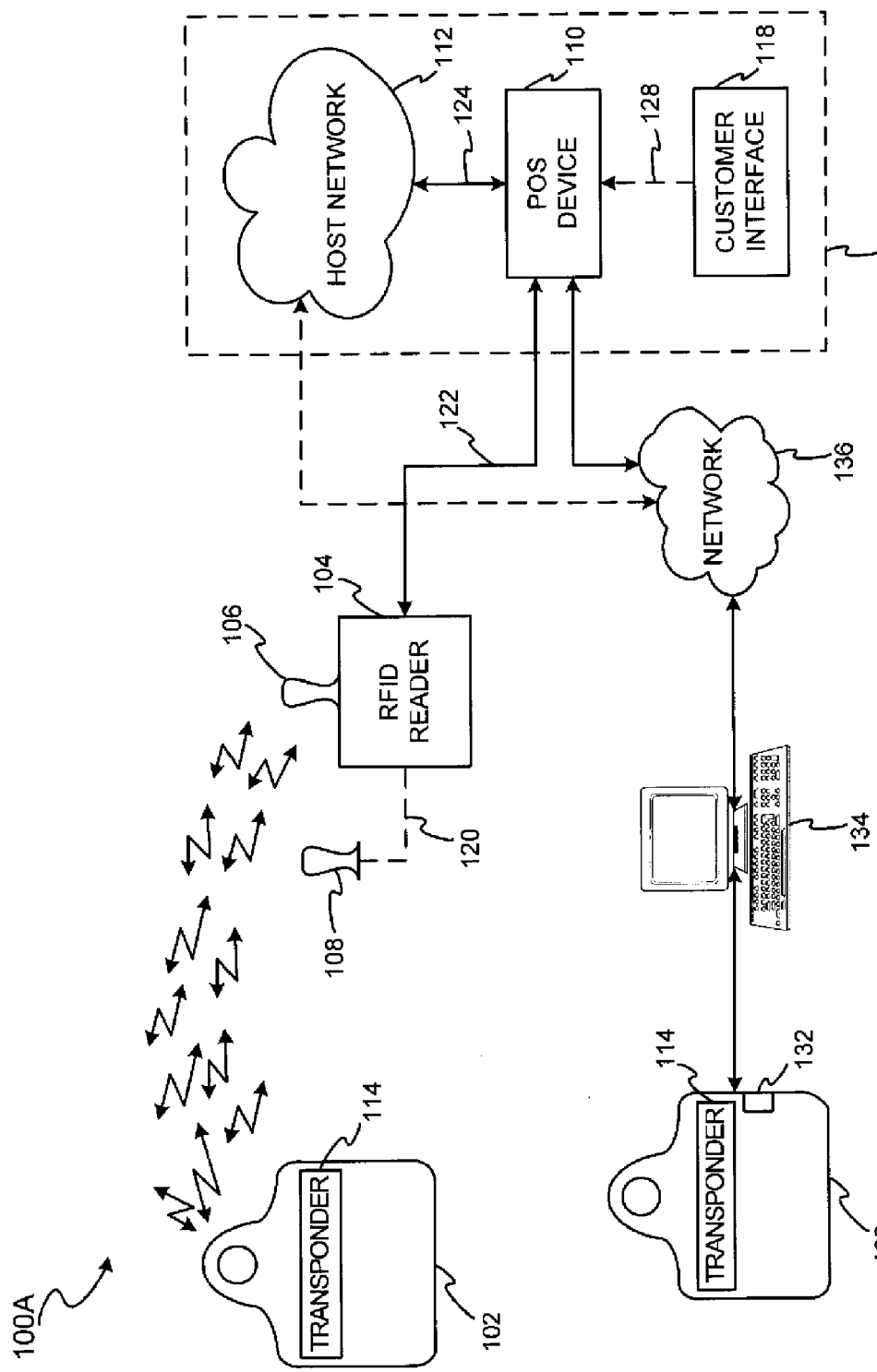
FIG. 1A illustrates an exemplary RFID-based system in accordance with the present invention.

The present invention may be described herein in terms of functional block components, screen shots, optional selections and various processing steps. Such functional blocks may be realized by any number of hardware and/or software components configured to perform the specified functions. For example, the present invention may employ various integrated circuit components (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), JavaCard and MULTOS with the various algorithms being implemented with any combination of data structures, objects, processes, routines or other programming elements. Further, it should be noted that the present invention may employ any number of conventional techniques for data transmission, signaling, data processing, network control, and the like. For a basic introduction on cryptography, review a text written by Bruce Schneier entitled "Applied Cryptography: Protocols, Algorithms, and Source Code in C," published by John Wiley & Sons (second edition, 1996), herein incorporated by reference.

The computing units may be connected with each other via a data communication network. The network may be a public network and assumed to be insecure and open to eavesdroppers. In the illustrated implementation, the network may be embodied as the Internet. In this context, the computers may or may not be connected to the Internet at all times. For instance, the customer computer may employ a modem to occasionally connect to the Internet, whereas the bank computing center might maintain a permanent connection to the Internet. Specific information related to the protocols, standards, and application software utilized in connection with the Internet may not be discussed herein. For further information regarding such details, see, for example, Dilip Naik, "Internet Standards and Protocols" (1998); "Java 2 Complete," various authors (Sybex 1999); Deborah Ray and Eric Ray, "Hosting HTML 4.0" (1997); Loshin, "TCP/IP Clearly Explained" (1997). All of these texts are hereby incorporated by reference.

It may be appreciated that many applications of the present invention could be formulated. One skilled in the art may appreciate that a network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention is frequently described herein as being implemented with TCP/IP communications protocols, it may be readily understood that the invention could also be implemented using IPX, Appletalk, IP-6, NetBIOS, OSI or any number of existing or future protocols. Moreover, the present invention contemplates the use, sale or distribution of any goods, services or information over any network having similar functionality described herein.

In accordance with various embodiments of the invention, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Interbase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and/or the like.

Where required, the system user may interact with the system via any input device such as, a keypad, keyboard, mouse, kiosk, personal digital assistant, handheld computer (e.g., Palm Pilot®, Blackberry®), cellular phone and/or the like. Similarly, the invention could be used in conjunction with any type of personal computer, network computer, work station, minicomputer, mainframe, or the like running any operating system such as any version of Windows, Windows XP, Windows NT, Windows 2000, Windows 98, Windows 95, MacOS, OS/2, BeOS, Linux, UNIX, Solaris, MVS or the like. Moreover, although the invention may frequently be described as being implemented with TCP/IP communications protocol, it should be understood that the invention could also be implemented using SNA, IPX, Appletalk, IPte, NetBIOS, OSI or any number of communications protocols. Moreover, the system contemplates the use, sale, or distribution of any goods, services or information over any network having similar functionality described herein.

FIG. 1A illustrates an exemplary RFID transaction system 100A in accordance with the present invention, wherein exemplary components for use in completing a fob transaction are depicted. In general, the operation of system 100A may begin when fob 102 is presented for payment, and is interrogated by RFID reader 104 or, alternatively, interface 134. Fob 102 and RFID reader 104 may then engage in mutual authentication after which fob 102 may provide the transponder identification and/or account identifier to the RFID reader 104 which may further provide the information to the merchant system 130 POS device 110.

System 100A may include fob 102 having a transponder 114 and RFID reader 104 in RF communication with fob 102. Although the present invention is described with respect to a fob 102, the invention is not to be so limited. Indeed, system 100A may include any device having a transponder which is configured to communicate with RFID reader 104 via RF communication. Typical devices may include, for example, a key ring, tag, card, cell phone, wristwatch or any such form capable of being presented for interrogation.

RFID reader 104 may be configured to communicate using an RFID internal antenna 106. Alternatively, RFID reader 104 may include an external antenna 108 for communications with fob 102, where the external antenna may be made remote to RFID reader 104 using a suitable cable and/or data link 120. RFID reader 104 may be further in communication with merchant system 130 via a data link 122. System 100A may include a transaction completion system including a point-of-interaction device such as, for example, a merchant point-of-sale (POS) device 110 or a computer interface (e.g., user interface) 134. In one exemplary embodiment the transaction completion system may include merchant system 130 including POS device 110 in communication with RFID reader 104 (via data link 122). As described more fully below, the transaction completion system may include the user interface 134 connected to a network 136 and to transponder 114 via a USB connector 132.

Although the point-of-interaction device is described herein with respect to a merchant point-of-sale (POS) device, the invention is not to be so limited. Indeed, a merchant POS device is used herein by way of example, and the point-of-interaction device may be any device capable of receiving fob account data. In this regard, the POS may be any point-of-interaction device enabling the user to complete a transaction using fob 102. POS device 110 may be in further communication with a customer interface 118 (via data link 128) for entering at least a customer's identity verification information. In addition, POS device 110 may be in communication with a merchant host network 112 (via data link 124) for processing any transaction request. In this arrangement, information provided by RFID reader 104 is provided to POS device 110 of merchant system 130 via data link 122. POS device 110 may receive the information (and alternatively may receive any identity verifying information from customer interface 118 via data link 128) and provide the information to host system 112 for processing.

A variety of conventional communications media and protocols may be used for data links 120, 122, 124, and 128. For example, data links 120, 122, 124, and 128 may be an Internet Service Provider (ISP) configured to facilitate communications over a local loop as is typically used in connection with standard modem communication, cable modem, dish networks, ISDN, Digital Subscriber Lines (DSL), or any wireless communication media. In addition, the merchant system 130, including POS device 110 and host network 112, may reside on a local area network which interfaces with a remote network (not shown) for remote authorization of an intended transaction. The merchant system 130 may communicate with the remote network via a leased line, such as a T1, D3 line, or the like. Such communications lines are described in a variety of texts, such as, "Understanding Data Communications," by Gilbert Held, which is incorporated herein by reference.

An account number, as used herein, may include any identifier for an account (e.g., credit, charge, debit, checking, savings, reward, loyalty, or the like) which may be maintained by a transaction account provider (e.g., payment authorization center) and which may be used to complete a financial transaction. A typical account number (e.g., account data) may be correlated to a credit or debit account, loyalty account, or rewards account maintained and serviced by such entities as American Express®, Visa® and/or HostCard® or the like. For ease in understanding, the present invention may be described with respect to a credit account. However, it should be noted that the invention is not so limited and other accounts permitting an exchange of goods and services for an account data value is contemplated to be within the scope of the present invention.

In addition, the account data (e.g., account number) may be associated with any device, code, or other identifier/indicia suitably configured to allow the consumer to interact or communicate with the system, such as, for example, authorization/access code, personal identification number (PIN), Internet code, digital certificate, biometric data, and/or other identification indicia. The account number may be optionally located on a rewards card, charge card, credit card, debit card, prepaid card, telephone card, smart card, magnetic stripe card, bar code card, and/or the like. The account number may be distributed and stored in any form of plastic, electronic, magnetic, and/or optical device capable of transmitting or downloading data to a second device. A customer account number may be, for example, a sixteen-digit credit card number, although each credit provider has its own numbering system, such as the fifteen-digit numbering system used by American Express®. Each company's credit card numbers comply with that company's standardized format such that the company using a sixteen-digit format will generally use four spaced sets of numbers, as represented by the number "0000 0000 0000 0000". In a typical example, the first five to seven digits are reserved for processing purposes and identify the issuing bank, card type, etc. In this example, the last digit is used as a sum check for the sixteen-digit number. The intermediary eight-to-ten digits are used to uniquely identify the customer. The account number stored as Track 1 and Track 2 data as defined in ISO/IEC 7813, and further may be made unique to fob 102. In one exemplary embodiment, the account number may include a unique fob serial number and user identification number, as well as specific application applets. The account number may be stored in fob 102 inside a database 214, as described more fully below. Database 214 may be configured to store multiple account numbers issued to fob 102 user by the same or different account providing institutions. Where the account data corresponds to a loyalty or rewards account, database 214 may be configured to store the attendant loyalty or rewards points data.

A "transaction," as defined herein, includes, inter alia, any exchange and/or delivery of value, exchange and/or delivery of data, gifting of value and/or data, etc. The term "transaction" not only contemplates an exchange of goods and/or services for value from one party to another, but also the gifting of something from one party to another.

Figure 2:
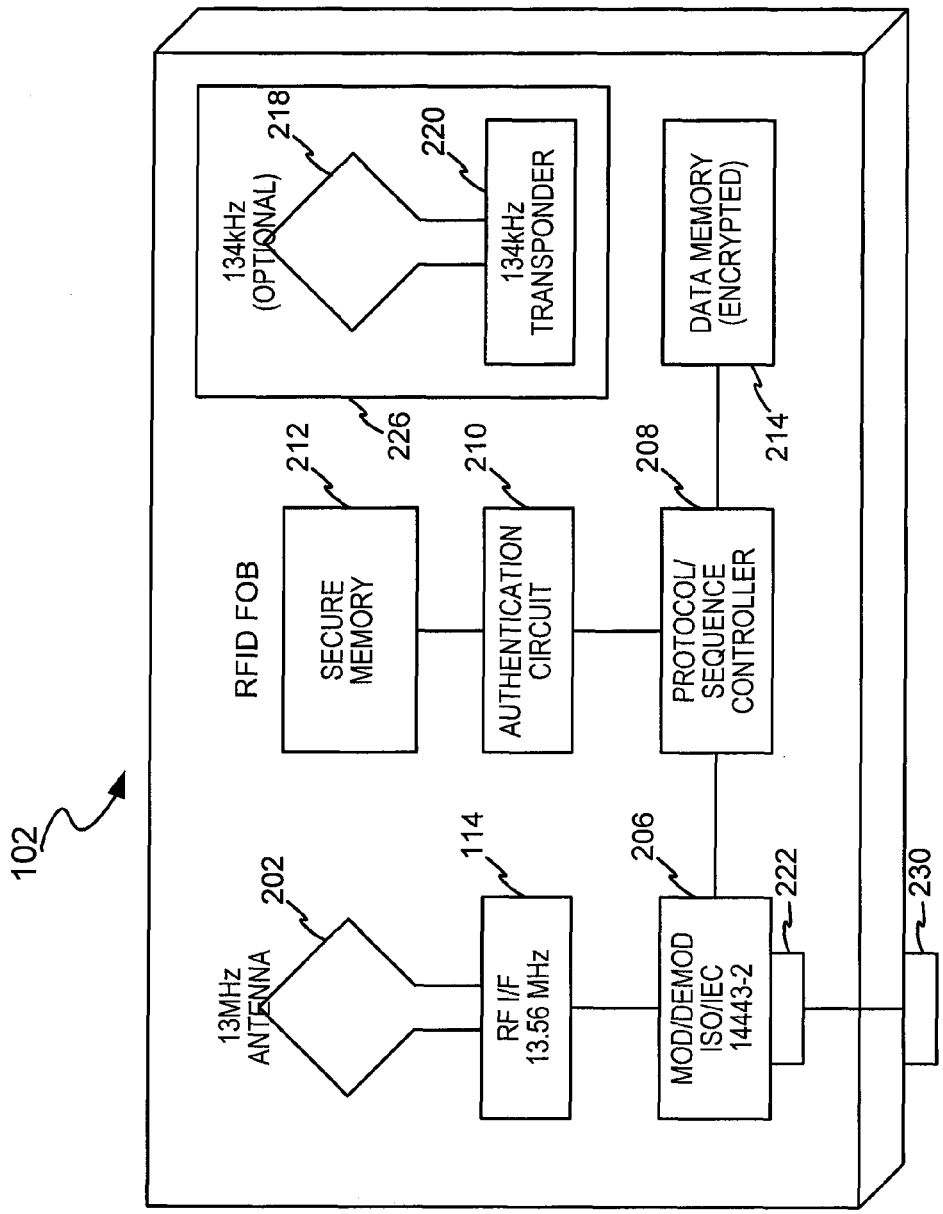
FIG. 2 is a schematic illustration of an exemplary fob in accordance with the present invention.

FIG. 2 illustrates a block diagram of the many functional blocks of an exemplary fob 102 in accordance with the present invention. Fob 102 may be an RFID fob 102 which may be presented by the user to facilitate an exchange of funds or points, etc., for receipt of goods or services. As described herein, by way of example, fob 102 may be an RFID fob which may be presented for facilitating payment for goods and/or services.

Fob 102 may include an antenna 202 for receiving an interrogation signal from RFID reader 104 via antenna 106 (or alternatively, via external antenna 108). Fob antenna 202 may be in communication with a transponder 114. In one exemplary embodiment, transponder 114 may be a 13.56 MHz transponder compliant with the ISO/IEC 14443 standard, and antenna 202 may be of the 13 MHz variety. Transponder 114 may be in communication with a transponder compatible modulator/demodulator 206 configured to receive the signal from transponder 114 and configured to modulate the signal into a format readable by any later connected circuitry. Further, modulator/demodulator 206 may be configured to format (e.g., demodulate) a signal received from the later connected circuitry in a format compatible with transponder 114 for transmitting to RFID reader 104 via antenna 202. For example, where transponder 114 is of the 13.56 MHz variety, modulator/demodulator 206 may be ISO/IEC 14443-2 compliant. Fob 102 may also be configured for near field communication. See, for example, Sony's "Near Field Communication" ("NFC") emerging standard which is touted as operating on 13.56 MHz and allowing the transfer of any kind of data between NFC enabled devices and across a distance of up to twenty centimeters. See also, Bluetooth chaotic network configurations; described in more detail at http://www.palowireless.com/infotooth/whatis.asp, which are incorporated herein by reference. Furthermore, data on a first fob 102 may be transmitted directly or indirectly to another fob 102 to create a copy of all or part of the original device.

Modulator/demodulator 206 may be coupled to a protocol/sequence controller 208 for facilitating control of the authentication of the signal provided by RFID reader 104, and for facilitating control of the sending of fob 102 account number. In this regard, protocol/sequence controller 208 may be any suitable digital or logic driven circuitry capable of facilitating determination of the sequence of operation for fob 102 inner-circuitry. For example, protocol/sequence controller 208 may be configured to determine whether the signal provided by RFID reader 104 is authenticated, and thereby providing to RFID reader 104 the account number stored on fob 102.

Protocol/sequence controller 208 may be further in communication with authentication circuitry 210 for facilitating authentication of the signal provided by RFID reader 104. Authentication circuitry 210 may be further in communication with a non-volatile secure memory database 212. Secure memory database 212 may be any suitable elementary file system such as that defined by ISO/IEC 7816-4 or any other elementary file system allowing a lookup of data to be interpreted by the application on the chip. Database 212 may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Databases may be organized in any suitable manner, including as data tables or lookup tables. Association of certain data may be accomplished through any data association technique known and practiced in the art. For example, the association may be accomplished either manually or automatically. Association techniques include common techniques such as using a key field in the tables to speed searches, sequential searches through all the tables and files, and sorting records in the file according to a known order to simplify lookup.

In accordance with one aspect of the present invention, any suitable data storage technique may be utilized to store data without a standard format. Data sets may be stored using any suitable technique, for example, storing individual files using an ISO/IEC 7816-4 file structure; implementing a domain whereby a dedicated file may be selected that exposes one or more elementary files containing one or more data sets; using data sets stored in individual files using a hierarchical filing system; data sets stored as records in a single file (for example, compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats may be facilitated by storing the information as a Block of Binary (BLOB). Thus, any binary information may be stored in a storage space associated with a data set. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with a wide variety of system components by multiple and unrelated owners of the data sets. For example, a first data set which may be stored may be provided by a first issuer, a second data set which may be stored may be provided by an unrelated second issuer, and yet a third data set which may be stored, may be provided by a third issuer unrelated to the first and second issuer. Each of these three exemplary data sets may contain different information that may be stored using different data storage formats and/or techniques. Further, each data set may contain subsets of data which also may be distinct from other subsets.

As stated above, in various embodiments of the present invention, the data may be stored without regard to a common format. However, in one exemplary embodiment of the present invention, the data set (e.g., BLOB) may be annotated in a standard manner when provided for manipulating the data onto the network. The annotation may comprise a short header, trailer, or other appropriate indicator related to each data set that may be configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set (e.g., LOADED, INITIALIZED, READY, BLOCKED, REMOVABLE, or DELETED). Subsequent bytes of data may be used to indicate for example, the identity of the resource, user, account identifier or the like. Each of these condition annotations are further discussed herein.

The data may be used by protocol/sequence controller 208 for data analysis and used for management and control purposes, as well as security purposes. Authentication circuitry may authenticate the signal provided by RFID reader 104 by association of the RFID signal to authentication keys stored on database 212. Encryption circuitry may use keys stored on database 212 to perform encryption and/or decryption of signals sent to or from RFID reader 104.

In addition, protocol/sequence controller 208 may be in communication with a database 214 for storing at least fob 102 account data, and a unique fob 102 identification code. Protocol/sequence controller 208 may be configured to retrieve the account number from database 214 as desired. Database 214 may be of the same configuration as database 212 described above. The fob account data and/or unique fob identification code stored on database 214 may be encrypted prior to storage. Thus, where protocol/sequence controller 208 retrieves the account data, and or unique fob identification code from database 214, the account number may be encrypted when being provided to RFID reader 104. Further, the data stored on database 214 may include, for example, an unencrypted unique fob 102 identification code, a user identification, Track 1 and 2 data, as well as specific application applets.

Fob 102 may be configured to respond to multiple interrogation frequency transmissions provided by RFID reader 104. That is, as described more fully below, RFID reader 104 may provide more than one RF interrogation signal. In this case, fob 102 may be configured to respond to the multiple frequencies by including in fob 102 one or more additional RF signal receiving/transmitting units 226. RF signal receiving/transmitting unit 226 may include an antenna 218 and transponder 220 where the antenna 218 and transponder 220 are compatible with at least one of the additional RF signals provided by RFID reader 104. For example, in one exemplary embodiment, fob 102 may include a 134 kHz antenna 218 configured to communicate with a 134 kHz transponder 220. In this exemplary configuration, an ISO/IEC 14443-2 compliant modulator/demodulator may not be required. Instead, the 134 kHz transponder may be configured to communicate directly with the protocol/sequence controller 208 for transmission and receipt of authentication and account number signals as described above.

In another embodiment, fob 102 may further include a universal serial bus (USB) connector 132 for interfacing fob 102 to a user interface 134. User interface 134 may be further in communication with a POS device 110 via a network 136. Network 136 may be the Internet, an intranet, or the like as is described above with respect to network 112. Further, the user interface 134 may be similar in construction to any conventional input devices and/or computing systems aforementioned for permitting the system user to interact with the system. In one exemplary embodiment, fob 102 may be configured to facilitate online Internet payments. A USB converter 222 may be in communication with a USB connector 132 for facilitating the transfer of information between the modulator/demodulator 206 and USB connector 132. Alternatively, USB converter 222 may be in communication with protocol/sequence controller 208 to facilitate the transfer of information between protocol/sequence controller 208 and USB connector 132.

Where fob 102 includes a USB connector 132, fob 102 may be in communication with, for example, a USB port on user interface 134. The information retrieved from fob 102 may be compatible with credit card and/or smart card technology enabling usage of interactive applications on the Internet. No RFID reader may be required in this embodiment since the connection to POS device 110 may be made using a USB port on user interface 134 and a network 136.

Fob 102 may include means for enabling activation of the fob by the user. In one exemplary embodiment, a switch 230 which may be operated by the user of fob 102. The switch 230 on fob 102 may be used to selectively or inclusively activate fob 102 for particular uses. In this context, the term "selectively" may mean that the switch 230 enables the user to place fob 102 in a particular operational mode. For example, the user may place fob 102 in a mode for enabling purchase of a good or of a service using a selected account number. Alternatively, fob 102 may be placed in a mode as such that the fob account number is provided by USB connector 132 (or a serial port) only and fob transponder 114 is disabled. In addition, the term "inclusively" may mean that fob 102 is placed in an operational mode permitting fob 102 to be responsive to the RF interrogation and interrogation via the USB connector 132. In one particular embodiment, switch 230 may remain in an OFF position ensuring that one or more applications or accounts associated with fob 102 are nonreactive to any commands issued by RFID reader 104. As used herein, the OFF position may be termed the "normal" position of the activation switch 230, although other normal positions are contemplated.

In another exemplary embodiment, when switch 230 is moved from the OFF position, fob 102 may be deemed activated by the user. That is, switch 230 may activate internal circuitry in fob 102 for permitting fob 102 to be responsive to RF signals (e.g., commands from RFID reader 104). In this way, switch 230 may facilitate control of the active and inactive states of fob 102. Such control increases the system security by preventing inadvertent or illegal use of fob 102.

In one exemplary embodiment, switch 230 may be a simple mechanical device in communication with circuitry which may electrically prevent fob 102 from being powered by RFID reader 104. That is, when switch 230 is in its normal position, switch 230 may provide a short to fob 102 internal circuitry, preventing fob 102 from being responsive to interrogation by RF or via the USB connector 232. In this arrangement, switch 230 may be, for example, a "normally closed" (NC) configured switch, which may be electrically connected to the antenna 202 at the interface of the antenna 202 and transponder 114. Switch 230 may be depressed, which may open switch 230 fully activating the antenna 202.

In yet another exemplary embodiment, fob 102 may include a biometric sensor and biometric membrane configured to operate as switch 230 and activate fob 102 when provided with a biometric signal from fob 102 user. Such biometric signal may be the digital reading of a fingerprint, thumbprint, or the like. Typically, where biometric circuitry is used, the biometric circuitry may be powered by an internal voltage source (e.g., battery). In this case, the switch may not be a simple mechanical device, but a switch which is powered. In yet another exemplary embodiment, switch 230 may be battery powered though no biometric circuitry is present in fob 102.

In yet another exemplary embodiment, switch 230 may be a logic switch. Where switch 230 is a logic switch, switch 230 control software may be read from the protocol/sequence controller 208 to selectively control the activation of the various fob 102 components.

Figure 3:
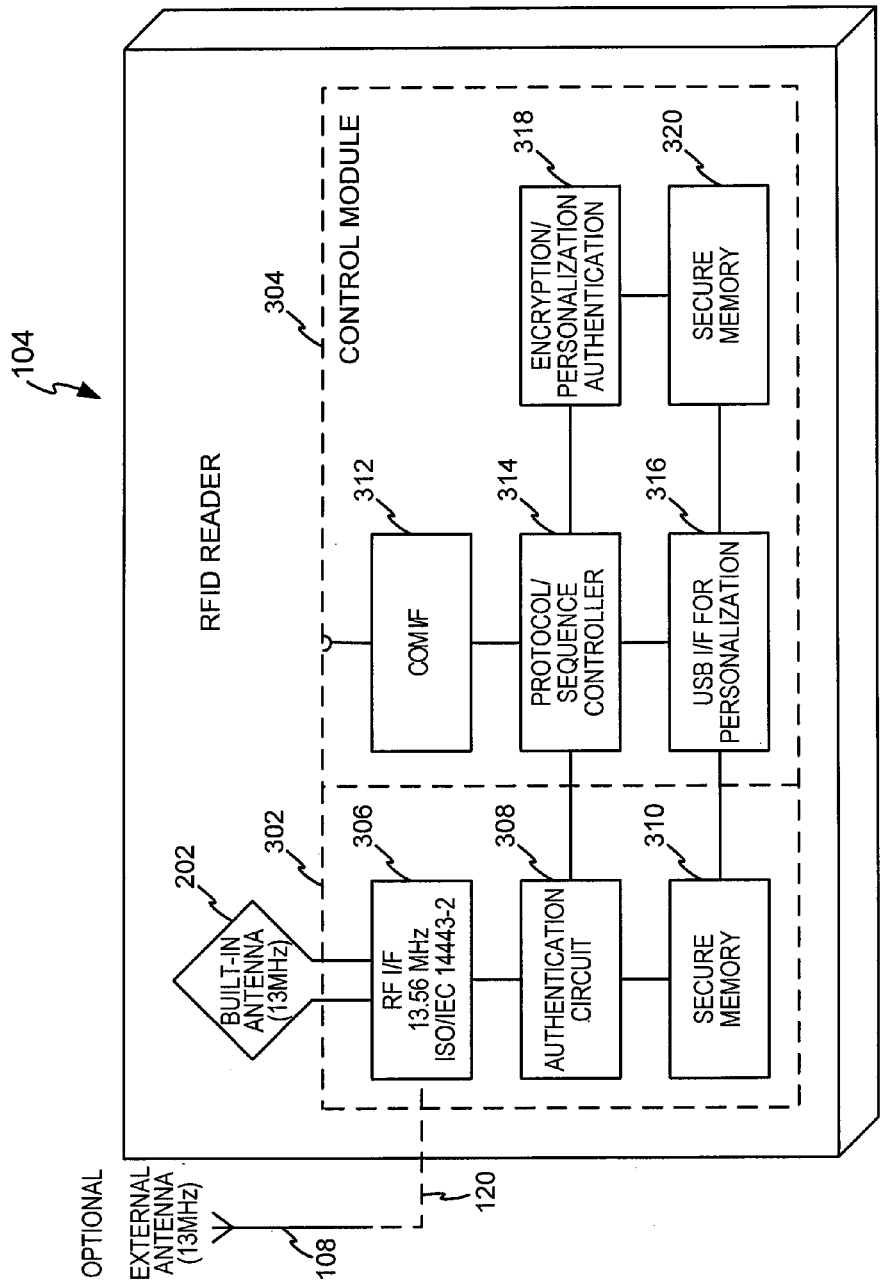
FIG. 3 is a schematic illustration of an exemplary RFID reader in accordance with the present invention.

FIG. 3 illustrates an exemplary block diagram of RFID reader 104 in accordance with an exemplary embodiment of the present invention. RFID reader 104 includes, for example, an antenna 106 coupled to an RF module 302, which is further coupled to a control module 304. In addition, RFID reader 104 may include an antenna 108 positioned remotely from RFID reader 104 and coupled to RFID reader 104 via a suitable cable 120, or other wire or wireless connection.

RF module 302 and antenna 106 may be suitably configured to facilitate communication with fob 102. Where fob 102 is formatted to receive a signal at a particular RF frequency, RF module 302 may be configured to provide an interrogation signal at that same frequency. For example, in one exemplary embodiment, fob 102 may be configured to respond to an interrogation signal of about 13.56 MHz. In this case, RFID antenna 106 may be 13 MHz and may be configured to transmit an interrogation signal of about 13.56 MHz. That is, fob 102 may be configured to include a first and second RF module (e.g., transponder) where the first module may operate using a 134 kHz frequency and the second RF module may operate using a 13.56 MHz frequency. RFID reader 104 may include two receivers which may operate using the 134 kHz frequency, the 13.56 MHz frequency or both. When the reader 104 is operating at 134 kHz frequency, only operation with the 134 kHz module on fob 102 may be possible. When the reader 104 is operating at the 13.56 MHz frequency, only operation with the 13.56 MHz module on fob 102 may be possible. Where RFID reader 104 supports both a 134 kHz frequency and a 13.56 MHz RF module, fob 102 may receive both signals from the reader 104. In this case, fob 102 may be configured to prioritize selection of one or the other frequency and reject the remaining frequency. Alternatively, RFID reader 104 may receive signals at both frequencies from fob 102 upon interrogation. In this case, RFID reader 104 may be configured to prioritize selection of one or the other frequency and reject the remaining frequency.

Further, protocol/sequence controller 314 may include an optional feedback function for notifying the user of the status of a particular transaction. For example, the optional feedback may be in the form of an LED, LED screen and/or other visual display which is configured to light up or display a static, scrolling, flashing and/or other message and/or signal to inform fob 102 user that the transaction is initiated (e.g., fob is being interrogated), the fob is valid (e.g., fob is authenticated), transaction is being processed, (e.g., fob account number is being read by RFID reader 104) and/or the transaction is accepted or denied (e.g., transaction approved or disapproved). Such optional feedback may or may not be accompanied by an audible indicator (or may present the audible indicator singly) for informing fob 102 user of the transaction status. The audible feedback may be a simple tone, multiple tones, musical indicator, and/or voice indicator configured to signify when fob 102 is being interrogated, the transaction status, or the like.

RFID antenna 106 may be in communication with a transponder 306 for transmitting an interrogation signal and receiving at least one of an authentication request signal and/or account data from fob 102. Transponder 306 may be of similar description as transponder 114 of FIG. 2. In particular, transponder 306 may be configured to send and/or receive RF signals in a format compatible with antenna 202 in a similar manner as was described with respect to fob transponder 114. For example, where transponder 306 is 13.56 MHz RF rated antenna 202 may be 13.56 MHz compatible. Similarly, where transponder 306 is ISO/IEC 14443 rated, antenna 106 may be ISO/IEC 14443 compatible.

RF module 302 may include, for example, transponder 306 in communication with authentication circuitry 308 which may be in communication with a secure database 310. Authentication circuitry 308 and database 310 may be of similar description and operation as described with respect to authentication circuitry 210 and secure memory database 212 of FIG. 2. For example, database 310 may store data corresponding to fob 102 which are authorized to transact business over system 100A. Database 310 may additionally store RFID reader 104 identifying information for providing the information to fob 102 for use in authenticating RFID reader 104. That is, RFID reader 104 identifying information is provided to fob 102 in order for fob 102 to authenticate RFID reader 104. Once fob 102 has authenticated RFID reader 104 using this information, fob 102 can provide the fob 102 account to RFID reader 104. The fob 102 account number is stored on database 214.

Authentication circuitry 308 may be of similar description and operation as authentication circuitry 210. That is, authentication circuitry 308 may be configured to authenticate the signal provided by fob 102 in similar manner that authentication circuitry 210 may be configured to authenticate the signal provided by RFID reader 104. As is described more fully below, fob 102 and RFID reader 104 engage in mutual authentication. In this context, "mutual authentication" may mean that operation of system 100A may not take place until fob 102 authenticates the signal from RFID reader 104, and RFID reader 104 authenticates the signal from fob 102.

Figure 4:
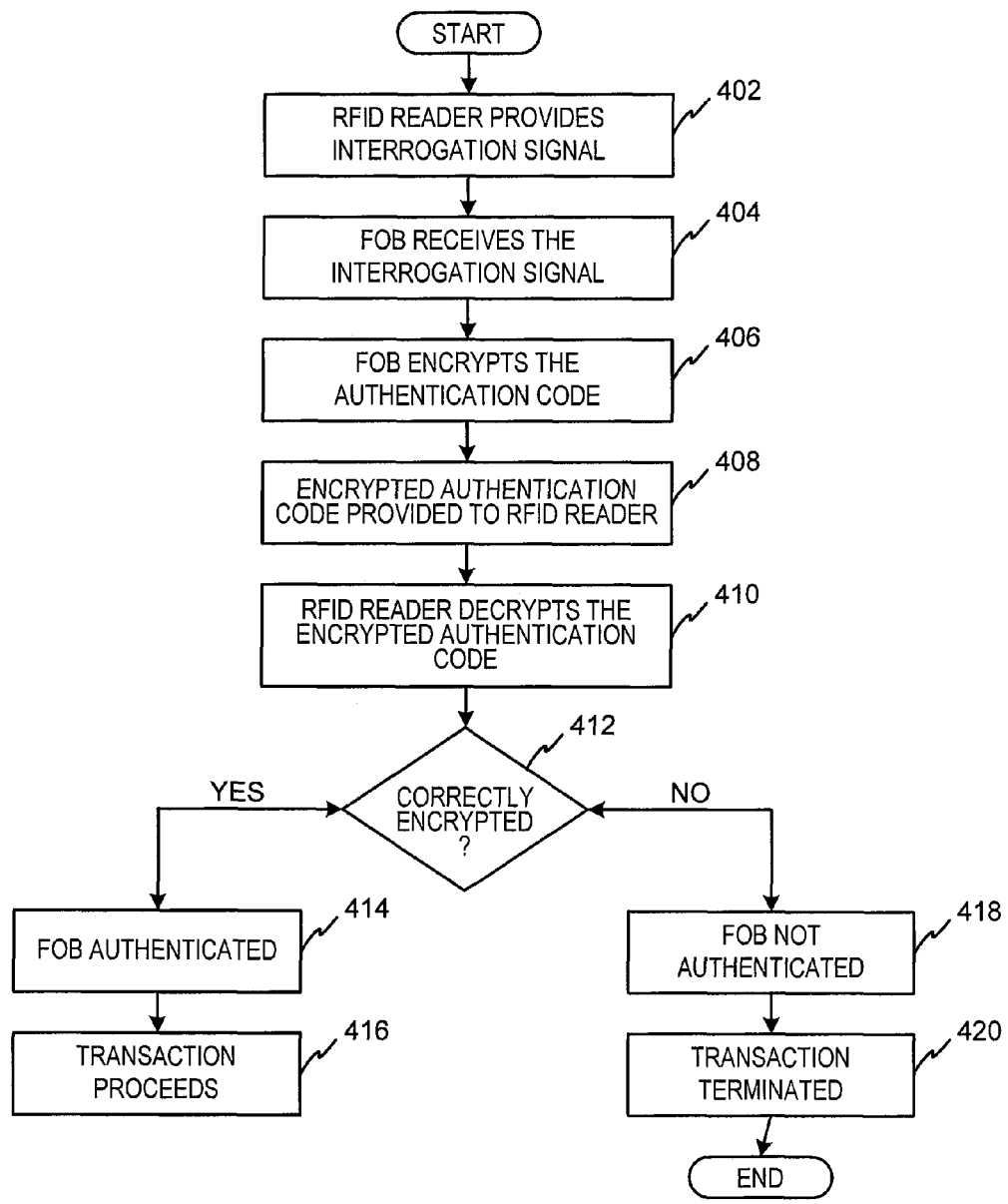
FIG. 4 is an exemplary flow diagram of an exemplary authentication process in accordance with the present invention.

FIG. 4 is a flowchart of an exemplary authentication process in accordance with the present invention. The authentication process is depicted as one-sided. That is, the flowchart depicts the process of RFID reader 104 authenticating fob 102, although similar steps may be followed in the event that fob 102 authenticates RFID reader 104.

As noted, database 212 may store security keys for encrypting or decrypting signals received from RFID reader 104. In an exemplary authentication process, where RFID reader 104 is authenticating fob 102, RFID reader 104 may provide an interrogation signal to fob 102 (step 402). The interrogation signal may include a random code generated by the RFID reader authentication circuit 308, which is provided to fob 102 and which is encrypted using an unique encryption key corresponding to fob 102 unique identification code. For example, the protocol/sequence controller 314 may provide a command to activate the authentication circuitry 308. RFID reader authentication circuit 308 may provide from database 310 a fob interrogation signal including a random number as a part of the authentication code generated for each authentication signal. The authentication code may be an alphanumeric code which is recognizable (e.g., readable) by RFID reader 104 and fob 102. The authentication code may be provided to fob 102 via the RFID RF interface 306 and antenna 106 (or alternatively antenna 108).

Fob 102 receives the interrogation signal (step 404). The interrogation signal including the authorization code may be received at RF interface 114 via antenna 202. Once fob 102 is activated, the interrogation signal including the authorization code may be provided to the modulator/demodulator circuit 206 where the signal may be demodulated prior to providing the signal to protocol/sequence controller 208. Protocol/sequence controller 208 may recognize the interrogation signal as a request for authentication of fob 102, and provide the authentication code to authentication circuit 210. Fob 102 may then encrypt the authentication code (step 406). In particular, encryption may be done by authentication circuit 210, which may receive the authentication code and encrypt the code prior to providing the encrypted authentication code to protocol/sequence controller 208. Fob 102 may then provide the encrypted authentication code to RFID reader 104 (step 408). That is, the encrypted authentication code may be provided to RFID reader 104 via modulator/demodulator circuit 206, RF interface 114 (e.g., transponder 114) and antenna 202.

RFID reader 104 may then receive the encrypted authentication code and decrypt it (step 410). That is, the encrypted authentication code may be received at antenna 106 and RF interface 306 and may be provided to authentication circuit 308. Authentication circuit 308 may be provided a security authentication key (e.g., transponder system decryption key) from database 310. Authentication circuit 308 may use the authentication key to decrypt (e.g., unlock) the encrypted authorization code. The authentication key may be provided to authentication circuit 308 based on fob 102 unique identification code. For example, the encrypted authentication code may be provided along with the unique fob 102 identification code. The authentication circuit 308 may receive fob 102 unique identification code and retrieve from the database 310 a transponder system decryption key correlative to the unique fob 102 identification code for use in decrypting the encrypted authentication code.

Once the authentication code is decrypted, the decrypted authentication code is compared to the authentication code provided by RFID reader 104 at step 402 (step 412) to verify its authenticity. If the decrypted authorization code is not readable (e.g., recognizable) by the authentication circuit 308, fob 102 is deemed to be unauthorized (e.g., unverified) (step 418) and the operation of system 100 is terminated (step 420). Contrarily, if the decrypted authorization code is recognizable (e.g., verified) by authentication circuit 308, the decrypted authorization code is deemed to be authenticated (step 414), and the transaction is allowed to proceed (step 416). In one particular embodiment, the proceeding transaction may mean that fob 102 may authenticate RFID reader 104 prior to RFID reader 104 authenticating fob 102, although, it should be apparent that RFID reader 104 may authenticate fob 102 prior to fob 102 authenticating RFID reader 104.

It should be noted that in an exemplary verification process, the authorization circuit 308 may determine whether the unlocked authorization code is identical to the authorization code provided in step 402. If the codes are not identical then fob 102 is not authorized to access system 100A. Although, the verification process is described with respect to identicality, identicality is not required. For example, authentication circuit 308 may verify the decrypted code through any protocol, steps, or process for determining whether the decrypted code corresponds to an authorized fob 102.

Figure 5:
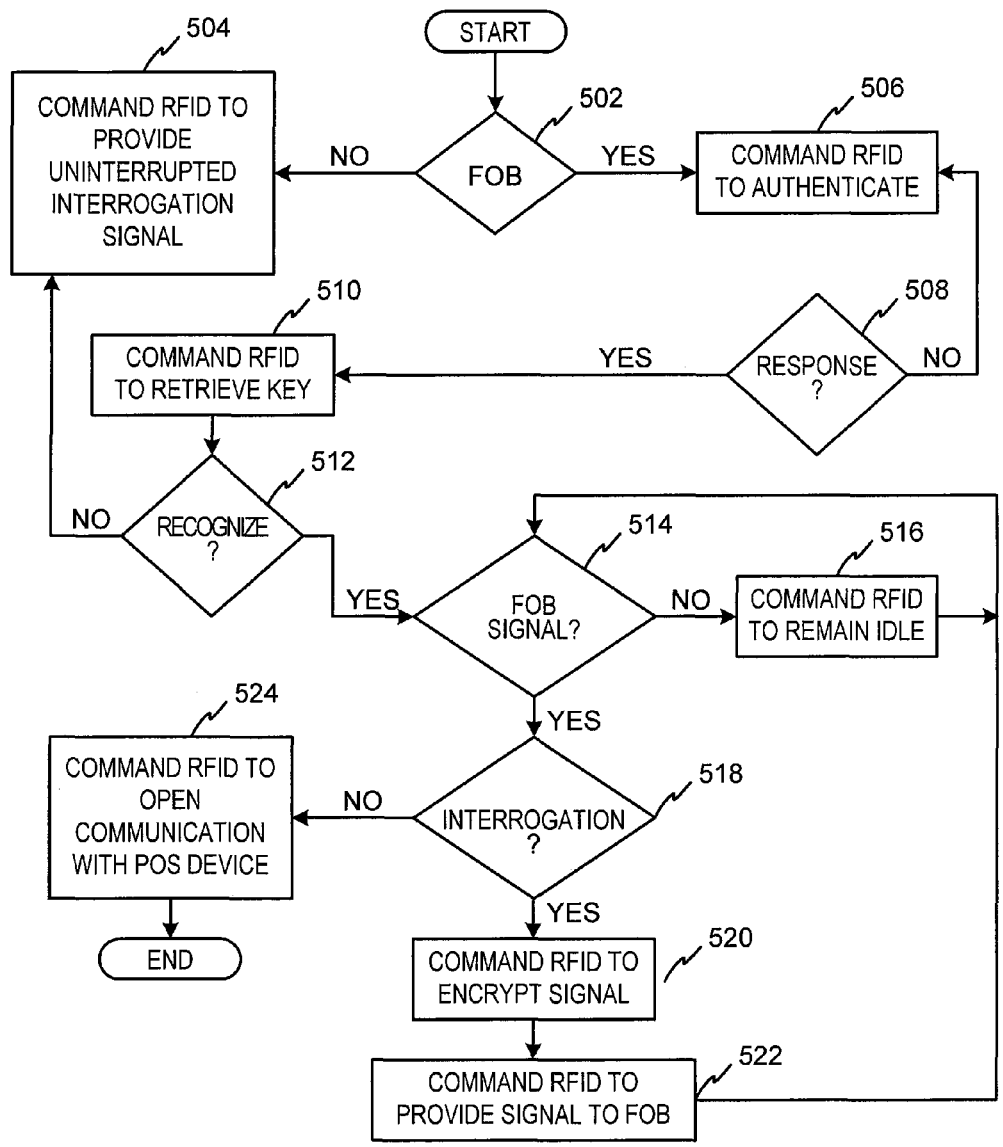
FIG. 5 is an exemplary flow diagram of an exemplary decision process for a protocol/sequence controller in accordance with the present invention.

Authentication circuitry 308 may additionally be in communication with a protocol/sequence controller 314 of similar operation and description as protocol/sequence controller 208 of FIG. 2. That is, protocol/sequence device controller 314 may be configured to determine the order of operation of RFID reader 104 components. For example, FIG. 5 illustrates an exemplary decision process under which protocol/sequence controller 314 may operate. Protocol/sequence controller 314 may command the different components of RFID reader 104 based on whether fob 102 is present (step 502). For example, if fob 102 is not present, then protocol/sequence controller 314 may command RFID reader 104 to provide an uninterrupted interrogation signal (step 504). That is, protocol/sequence controller 314 may command the authentication circuit 308 to provide an uninterrupted interrogation signal until the presence of fob 102 is realized. If fob 102 is present, protocol/sequence controller 314 may command RFID reader 104 to authenticate fob 102 (step 506).

As noted above, authentication may mean that protocol/sequence controller 314 may command authentication circuit 308 to provide fob 102 with an authorization code. If a response is received from fob 102, protocol/sequence controller 314 may determine if the response is a response to the RFID reader 104 provided authentication code, or if the response is a signal requiring authentication (step 508). If the signal requires authentication, then protocol/sequence controller 314 may activate authentication circuit 308 as described above (step 506). On the other hand, if the fob 102 signal is a response to the provided authentication code, then protocol/sequence controller 314 may command RFID reader 104 to retrieve the appropriate security key for enabling recognition of the signal (step 510). That is, protocol/sequence controller 314 may command authentication circuit 308 to retrieve from database 310 a security key (e.g., transponder system decryption key), unlock the signal, and compare the signal to the signal provided by RFID reader 104 in the authentication process (e.g., step 506). If the signal is recognized, protocol/sequence controller 314 may determine that fob 102 is authorized to access system 100A. If the signal is not recognized, then fob 102 is considered not authorized, in which case, protocol/sequence controller 314 may command the RFID reader 104 to interrogate for authorized fobs (step 504).

Once the protocol/sequence controller 314 determines that fob 102 is authorized, protocol/sequence controller 314 may seek to determine if additional signals are being sent by fob 102 (step 514). If no additional signal is provided by fob 102, then protocol/sequence controller 314 may command all the components of RFID reader 104 to remain idle until such time as a signal is provided (step 516). Contrarily, where an additional fob 102 signal is provided, protocol/sequence controller 314 may determine if fob 102 is requesting access to merchant point-of-sale terminal 110 (e.g., POS device) or if fob 102 is attempting to interrogate RFID reader 104 for return (e.g., mutual) authorization (step 518). Where fob 102 is requesting access to merchant point-of-sale terminal 110, protocol/sequence controller 314 may command RFID reader 104 to open communications with point-of-sale terminal 110 (step 524). In particular, protocol/sequence controller 314 may command the point-of-sale terminal communications interface 312 to become active, permitting transfer of data between RFID reader 104 and the merchant point-of-sale terminal 110.

On the other hand, if the protocol/sequence controller 314 determines that fob 102 signal is a mutual interrogation signal, then the protocol/sequence controller 314 may command RFID reader 104 to encrypt the signal (step 520). Protocol/sequence controller 314 may command the encryption authentication circuit 318 to retrieve from database 320 the appropriate encryption key in response to fob 102 mutual interrogation signal. Protocol/sequence controller 314 may then command RFID reader 104 to provide the encrypted mutual interrogation signal to fob 102. Protocol/sequence controller 314 may command the authentication circuit 318 to provide an encrypted mutual interrogation signal for fob 102 to mutually authenticate. Fob 102 protocol/sequence controller 208 may command authentication circuitry 210 to retrieve from database 212 an RFID reader decryption key.

Although an exemplary decision process of protocol/sequence controller 314 is described, it should be understood that a similar decision process may be undertaken by protocol/sequence controller 208 in controlling the components of fob 102. Indeed, as described above, protocol/sequence controller 314 may have similar operation and design as protocol/sequence controller 208. In addition, to the above, protocol/sequence controllers 208 and 314 may incorporate in the decision process appropriate commands for enabling USB interfaces 222 and 316, when the corresponding device is so connected.

Encryption/decryption component 318 may be further in communication with a secure account number database 320 which stores the security keys necessary for decrypting the encrypted fob account number. Upon appropriate request from protocol/sequence controller 314, encryption/decryption component (e.g., circuitry 318) may retrieve the appropriate security key, decrypt the fob account number and forward the decrypted account number to protocol sequence controller 314 in any format readable by any later connected POS device 110. In one exemplary embodiment, the account number may be forwarded in a conventional magnetic stripe format compatible with the ISO/IEC 7813 standard. That is, in accordance with the invention, there is no need to translate or correlate the account number to traditional magnetic stripe format as is done with the prior art. The invention processes the transaction request directly, as if the card associated with the account has been presented for payment.

Upon receiving the account number in magnetic stripe format, protocol/sequence controller 314 may forward the account number to POS device 110 via a communications interface 312 and data link 122, as best shown in FIG. 1. POS device 110 may receive the decrypted account number and forward the magnetic stripe formatted account number to a merchant network 112 for processing under the merchant's business as usual standard. In this way, the present invention eliminates the need of a third-party server. Further, where POS device 110 receives a response from network 112 (e.g., transaction authorized or denied), protocol/sequence controller 314 may provide the network response to the RF module 302 for optically and/or audibly communicating the response to fob 102 user.

RFID reader 104 may additionally include a USB interface 316, in communication with protocol/sequence controller 314. In one embodiment, the USB interface may be a RS22 serial data interface. Alternatively, RFID reader 104 may include a serial interface such as, for example, a RS232 interface in communication with protocol/sequence controller 314. The USB connector 316 may be in communication with a personalization system 116 (shown in FIG. 1B) for initializing RFID reader 104 to system 100B application parameters. That is, prior to operation of system 100, RFID reader 104 may be in communication with personalization system 116 for populating database 310 with a listing of security keys belonging to authorized fobs 102, and for populating database 320 with the security keys to decrypt fob 102 account numbers placing the account numbers in ISO/IEC 7813 format. In this way, RFID reader 104 may be populated with a unique identifier (e.g., serial number) which may be used by fob authentication circuitry 210 to determine if RFID reader 104 is authorized to receive fob 102 encrypted account number.

Figure 1B:
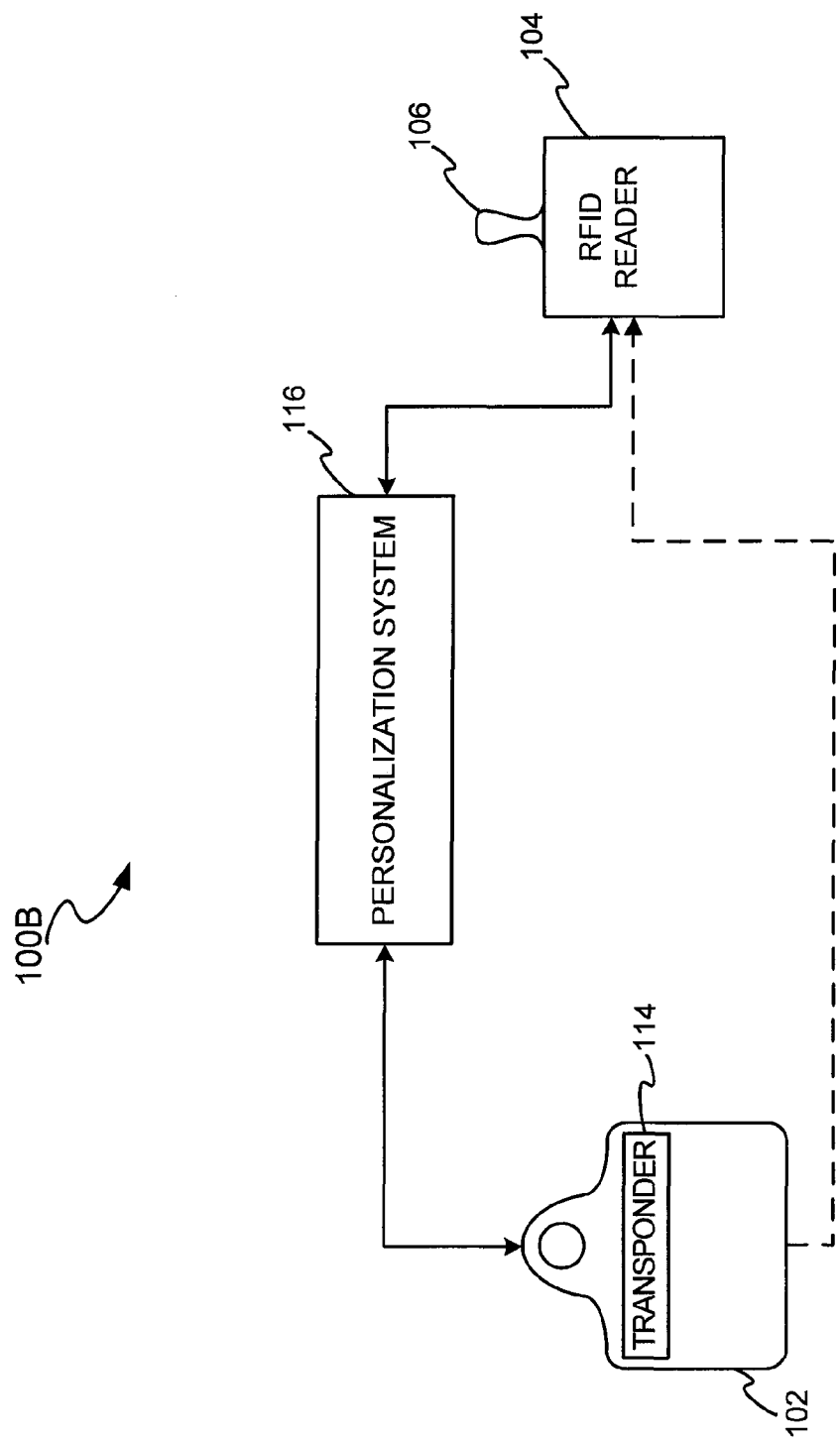
FIG. 1B illustrates an exemplary personalization system in accordance with the present invention.

FIG. 1B illustrates an exemplary personalization system 100B, in accordance with the present invention. In general, typical personalization system 100B may be any system for initializing RFID reader 104 and fob 102 for use in system 100A. With reference to FIG. 1B, the similar personalization process for fob 102 may be illustrated. For example, personalization system 116 may be in communication with fob 102 via RF ISO 14443 interface 114 for populating fob database 212 with the security keys for facilitating authentication of the unique RFID reader 104 identifier. In addition, personalization system 116 may populate on database 212 a unique fob 102 identifier for use by RFID reader 104 in determining whether fob 102 is authorized to access system 100B. Personalization system 116 may populate (e.g., inject) the encrypted fob 102 account number into fob database 214 for later providing to an authenticated RFID reader 104.

In one exemplary embodiment, personalization system 116 may include any standard computing system as described above. For example, personalization system 116 may include a standard personal computer containing a hardware security module operable using any conventional graphic user interface. Prior to populating the security key information account number and unique identifying information into fob 102 or RFID reader 104, the hardware security module may authenticate fob 102 and RFID reader 104 to verify that the components are authorized to receive the secure information.

Figure 6A:
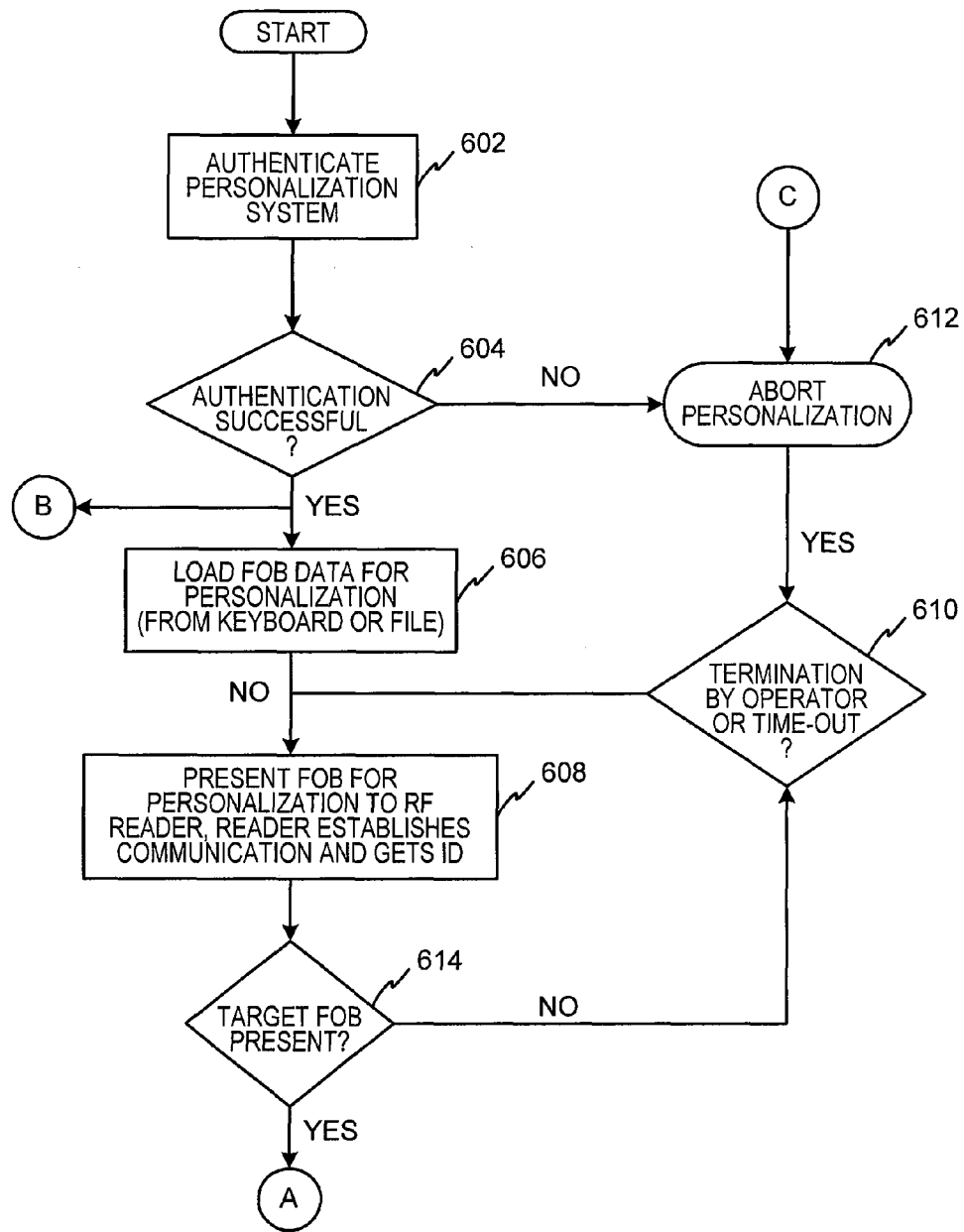
FIGS. 6A-B are an exemplary flow diagram of a fob personalization process in accordance with the present invention.
Figure 6B:
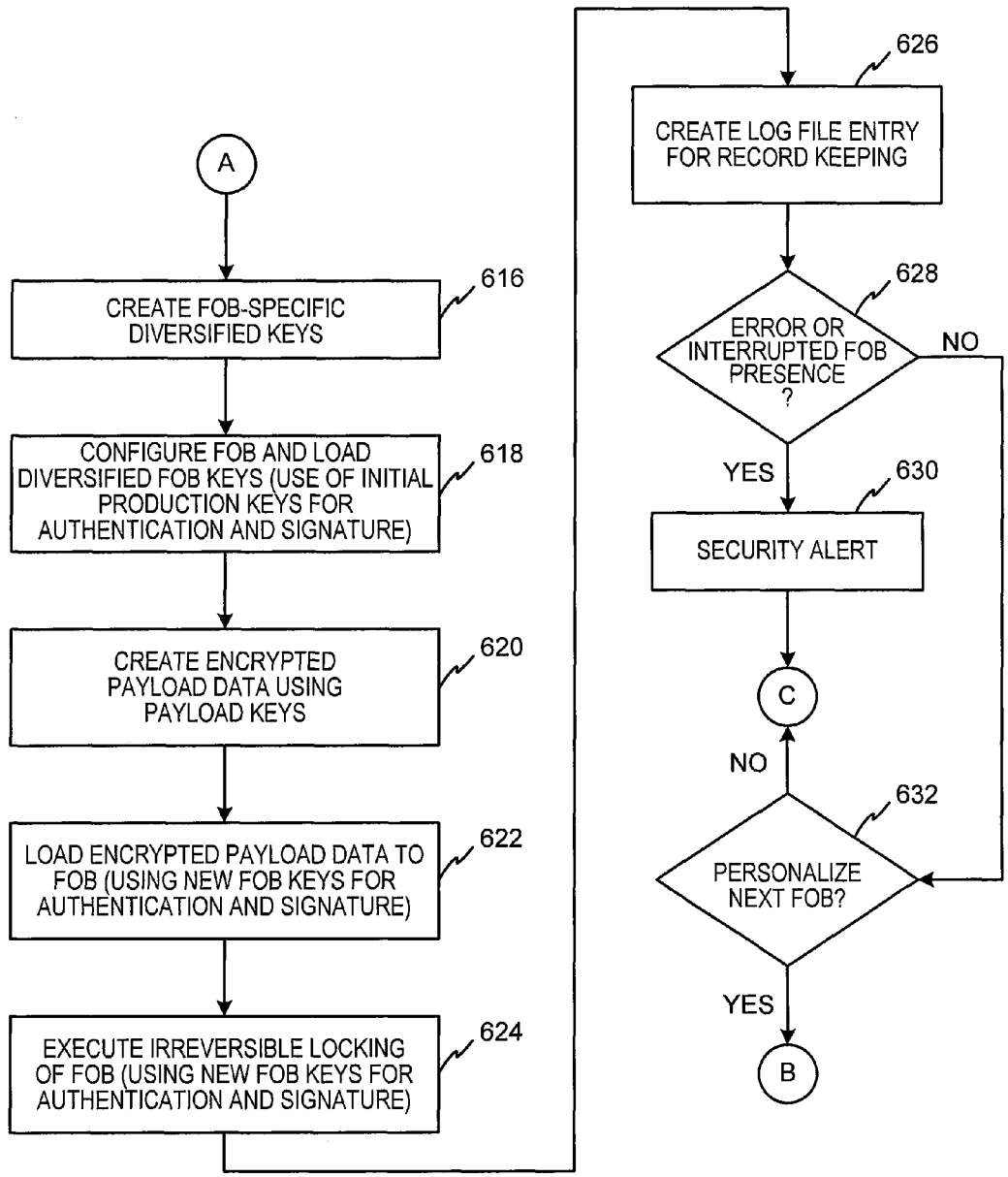

FIGS. 6A-B illustrate an exemplary flowchart of a personalization procedure which may be used to personalize fob 102 and/or RFID reader 104. Although the following description discusses mainly personalization of fob 102, RFID reader 104 may be personalized using a similar process. The personalization process, which occurs between personalization system 116 and the device to be personalized (e.g., fob 102 or RFID reader 104), may begin, for example at step 602. Mutual authentication may occur between personalization system 116 and the device to be authenticated in much the same manner as was described above with regard to mutual authentication between fob 102 and RFID reader 104. That is, personalization system 116 may transmit a personalization system 116 identifier to the device to be authenticated which is compared by device authentication circuitry 210, 308 against personalization system 116 identifiers stored in the device database 212, 310. Where a match does not occur (step 604), the personalization process may be aborted (step 612). Where a match occurs (step 604), the personalization system 116 may prepare a personalization file to be provided to the device to be personalized (step 606). If the personalization system 116 is operated manually, the personalization file may be entered into personalization system 116 using any suitable system interface such as, for example, a keyboard (step 606). Where personalization system 116 operator elects to delay the preparation of the personalization files, the personalization system 116 may abort the personalization process (step 610). In this context, the personalization file may include the unique fob 102 or RFID reader 104 identifier, security key for loading into database 212 and 310, and/or security keys for decrypting a fob account number which may be loaded in database 320.

Fob 102 may be personalized by direct connection to personalization system 116 via RF ISO/IEC 14443 interface 114, or fob 102 may be personalized using RFID reader 104. Personalization system 116 and RFID reader 104 may engage in mutual authentication and RFID reader 104 may be configured to transmit the fob personalization file to fob 102 via RF. Once fob 102 is presented to RFID reader 104 (steps 608, 614) for personalization, fob 102 and RFID reader 104 may engage in mutual authentication (step 614). Where fob 102 is not presented to RFID reader 104 for personalization, the personalization process may be aborted (step 612).

If fob 102 is detected, personalization system 116 may create as a part of the personalization file, a unique identifier for providing to fob 102 (step 616). The identifier is unique in that one identifier may be given only to a single fob. That is, no other fob may have that same identifier. Fob 102 may then be configured and loaded with that identifier (step 618).

The encrypted fob 102 account number may be populated into fob 102 in the same manner as is described with respect to the fob 102 unique identifier. That is, personalization system 116 may pre-encrypt the account data (step 640) and inject the encrypted account into fob database 214 (step 622). The encrypted account data may be loaded (e.g., injected) into fob 102 using RFID reader 104 as discussed above.

Once the personalization file is populated into fob 102, the populated information is irreversibly locked to prevent alteration, unauthorized reading and/or unauthorized access (step 624). Personalization system 116 may then create a log of the personalization file information for later access and analysis by personalization system 116 user (step 626).

It should be noted that in the event the personalization process is compromised or interrupted (step 628), personalization system 116 may send a security alert to the user (step 630) and the personalization process may be aborted (step 612). On the other hand, where no such compromising or interruption exists, personalization system 116 may be prepared to begin initialization on a second device to be personalized (step 632).

Figure 7A:
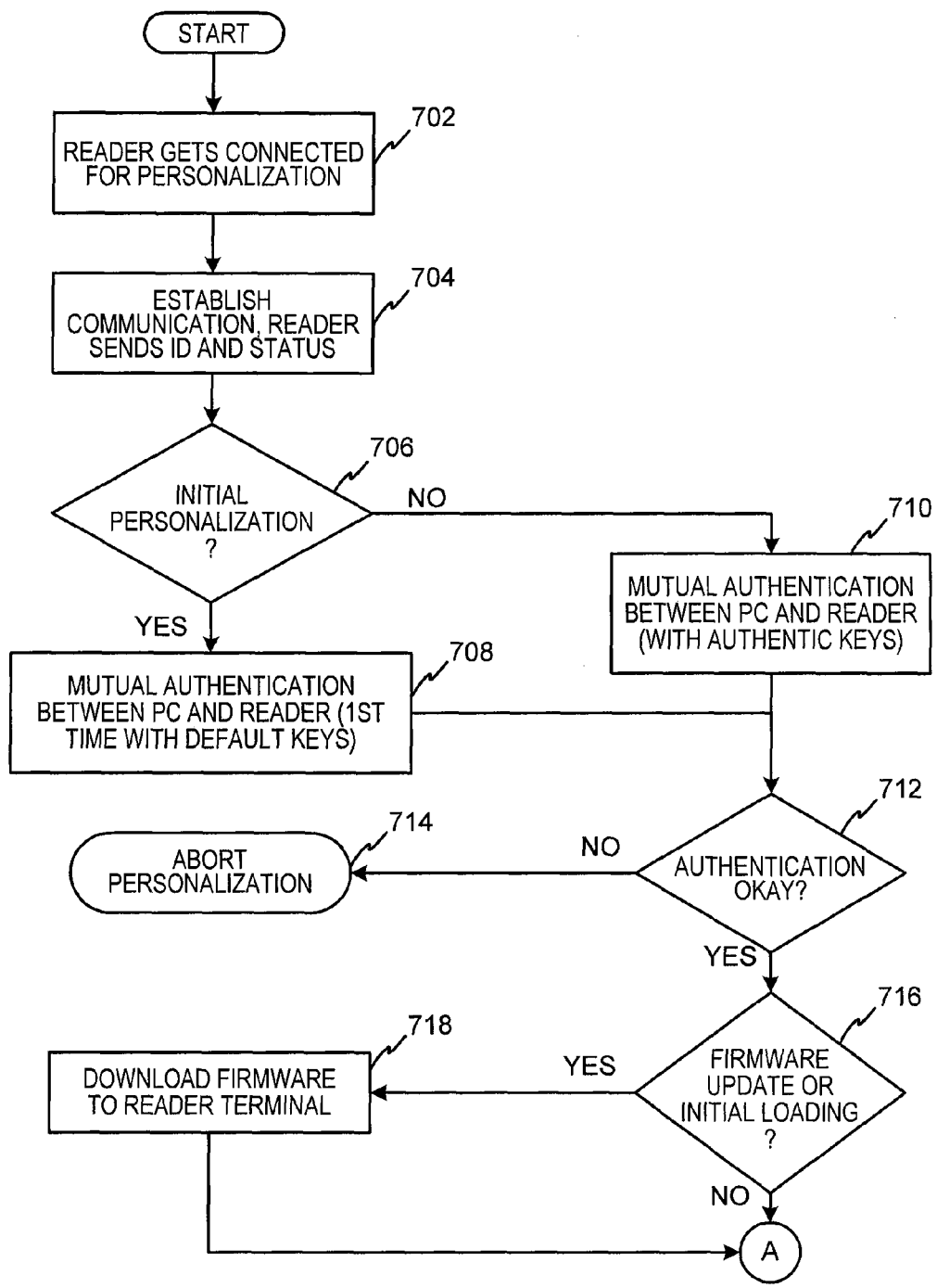
FIGS. 7A-B are an exemplary flow diagram of an RFID reader personalization process in accordance with the present invention.
Figure 7B:
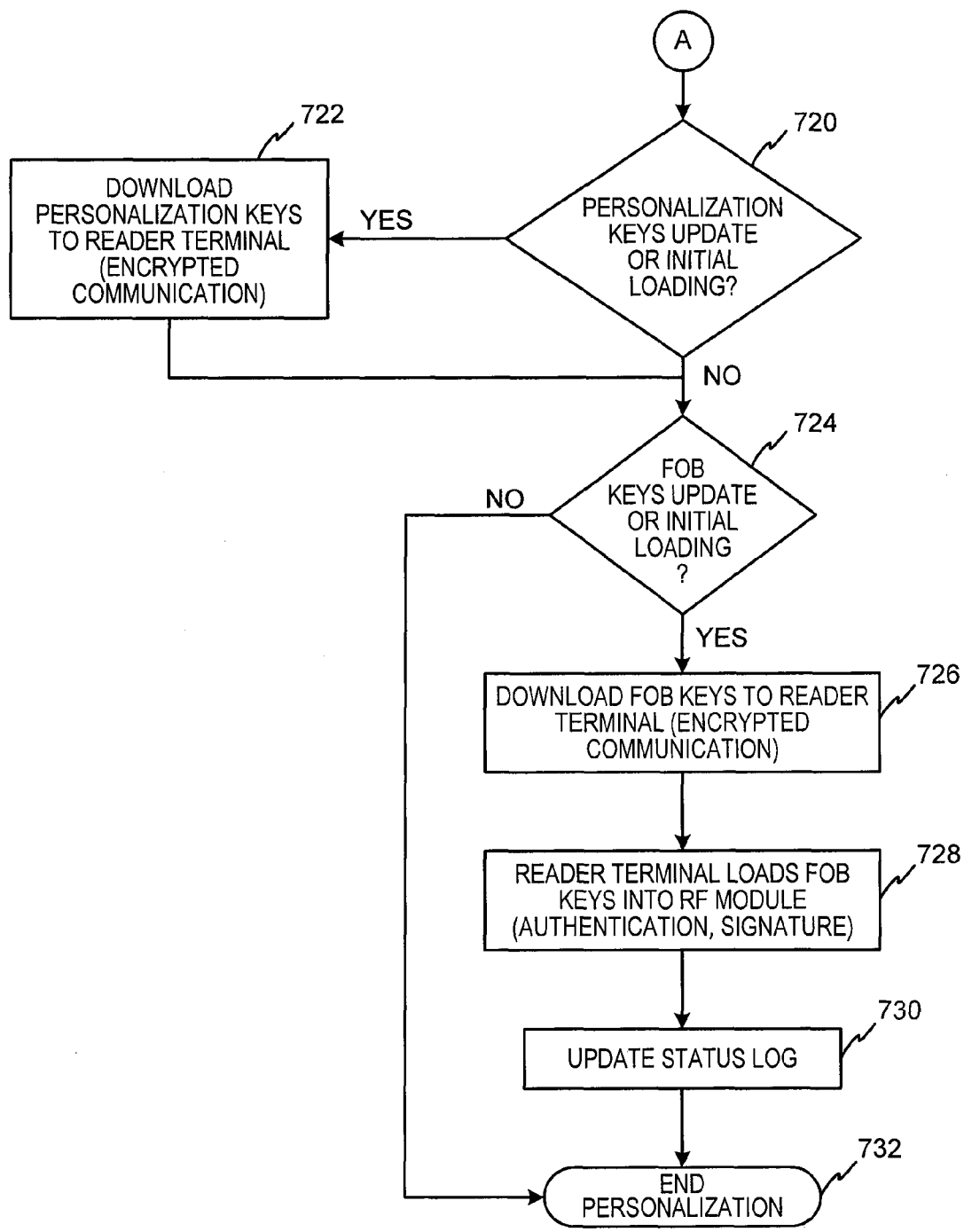

FIGS. 7A-B illustrate another exemplary embodiment of a personalization process which may be used to personalize RFID reader 104. RFID reader 104 may be in communication with a personalization system 116 via RFID reader USB connection 316 (step 702). Once connected, personalization system 116 may establish communications with RFID reader 104 and RFID reader 104 may provide personalization system 116 any RFID reader 104 identification data presently stored on RFID reader 104 (step 704). In accordance with step 708, where RFID reader 104 is being personalized for the first time (step 706), RFID reader 104 and personalization system 116 may engage in mutual authentication as described above with respect to FIGS. 6A-B. After the mutual authentication is complete, personalization system 116 may verify that RFID reader 104 is properly manufactured or configured to operate within system 100A. The verification may include evaluating the operation of RFID reader 104 by determining if the RFID reader will accept predetermined default settings. That is, personalization system 116 may then provide RFID reader 104 a set of default settings (step 708) and determine if RFID reader 104 accepts those settings (step 712). If RFID reader 104 does not accept the default settings, personalization system 116 may abort the personalization process (step 714).

If personalization system 116 determines that the personalization process is not the first personalization process undertaken by RFID reader 104 (step 706), personalization system 116 and RFID reader 104 may engage in a mutual authentication process using the existing security keys already stored on RFID reader 104 (step 710). If authentication is unsuccessful (step 712), personalization system 116 may abort the personalization process (step 714).

Where personalization system 116 and RFID reader 104 successfully mutually authenticate, personalization system 116 may update RFID reader 104 security keys (step 716). Updating the security keys may take place at any time as determined by a system 100A manager. The updating may take place as part of a routine maintenance or merely to install current security key data. The updating may be performed by downloading firmware into RFID reader 104 (step 718). In the event that personalization system 116 determines in step 706 that RFID reader 104 is undergoing an initial personalization, the firmware may be loaded into RFID reader 104 for the first time. In this context, "firmware" may include any file which enables the RFID reader 104 to operate under system 100A guidelines. For example, such guidelines may be directed toward the operation of RFID reader protocol/sequence controller 314.

Personalization system 116 may then determine if the personalization keys (e.g., security keys, decryption keys, RFID identifier) need to be updated or if RFID reader 104 needs to have an initial installation of the personalization keys (step 720). If so, then personalization system 116 may download the personalization keys as appropriate (step 722).

Personalization system 116 may then check RFID reader 104 to determine if fob 102 identifiers and corresponding security keys should be updated or initially loaded (step 724). If no updating is necessary personalization system 116 may end the personalization procedure (step 732). Contrarily, if personalization system 116 determines that fob 102 identifiers and corresponding keys need to be updated or installed, personalization system 116 may download the information onto RFID reader 104 (step 726). The information (e.g., fob security keys and identifiers) may be downloaded in an encrypted format and RFID reader 104 may store the information in the RFID reader database 310 as appropriate (step 728). Personalization system 116 may then create or update a status log cataloging for later use and analysis by personalization system 116 user (step 730). Upon updating the status log, the personalization process may be terminated (step 732).

It should be noted that, in some instances it may be necessary to repersonalize the RFID reader 104 in similar manner as described above. In that instance, the personalization process described in FIGS. 7A and 7B may be repeated.

Figure 8:
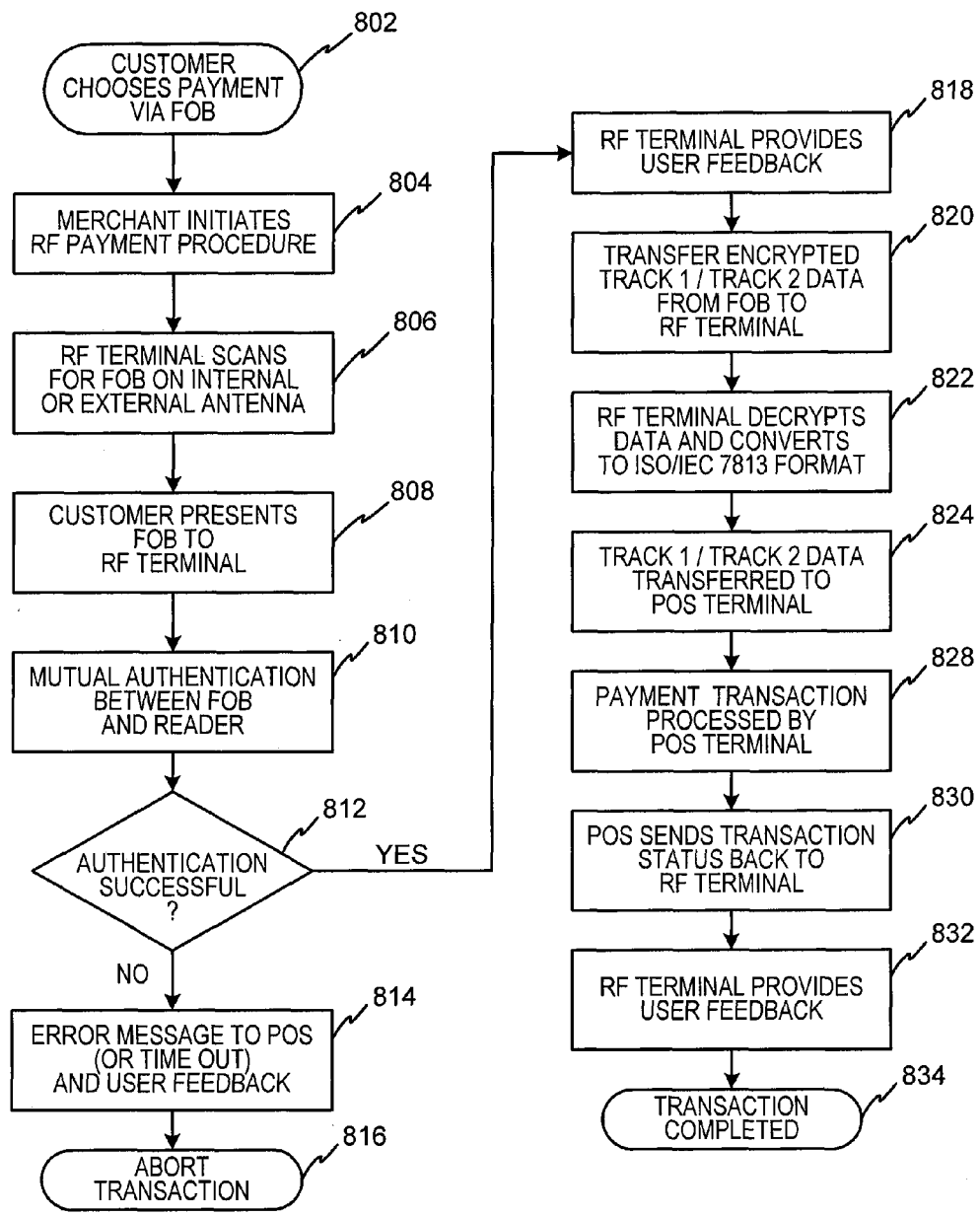
FIG. 8 is a flow diagram of an exemplary payment/transaction process in accordance with the present invention.

FIG. 8 illustrates an exemplary flow diagram for the operation of system 100A. The operation may be understood with reference to FIG. 1A, which depicts the elements of system 100A which may be used in an exemplary transaction. The process is initiated when a customer desires to present fob 102 for payment (step 802). Upon presentation of fob 102, the merchant initiates the RF payment procedure via an RFID reader 104 (step 804). In particular, the RFID reader 104 sends out an interrogation signal to scan for the presence of fob 102 (step 806). The RF signal may be provided via the RFID reader antenna 106 or optionally via an external antenna 108. The customer then may present fob 102 for payment (step 808) and fob 102 is activated by the RF interrogation signal provided.

Fob 102 and RFID reader 104 may then engage in mutual authentication (step 810). Where the mutual authentication is unsuccessful, an error message may be provided to the customer via the RFID optical and/or audible indicator (step 814) and the transaction may be aborted (step 816). Where the mutual authentication is successful (step 812), RFID reader 104 may provide the customer with an appropriate optical and/or audible message (e.g., "transaction processing" or "wait") (step 818). The fob protocol/sequence controller 208 may then retrieve from database 214 an encrypted fob account number and provide the encrypted account number to RFID reader 104 (step 820).

RFID reader 104 may then decrypt the account number and convert the account number into magnetic stripe (ISO/IEC 7813) format (step 822) and provide the unencrypted account number to the merchant system 130 (step 824). In particular, the account number may be provided to POS 110 device for transmission to the merchant network 112 for processing (step 828). Upon processing, POS device 110 may then send an optical and/or audible transaction status message to RFID reader 104 (step 830) for communication to the customer (step 832).

It should be noted that the transaction account associated with fob 102 may include a usage restriction, such as, for example, a per purchase spending limit, a time of day use, a day of week use, certain merchant use and/or the like, wherein an additional verification is required when using the fob outside of the restriction. The restrictions may be personally assigned by fob 102 user, or the account provider. For example, in one exemplary embodiment, the account may be established such that purchases above $X (i.e., the spending limit) must be verified by the customer. Such verification may be provided using a suitable personal identification number (PIN) which may be recognized by fob 102 or a payment authorization center (not shown) as being unique to fob 102 holder (e.g., customer) and the correlative fob 102 transaction account number. Where the requested purchase is above the established per purchase spending limit, the customer may be required to provide, for example, a PIN, biometric sample and/or similar secondary verification to complete the transaction. That is, for example, fob 102 may enter the unique PIN in a conventional keypad at a merchant system or RFID reader 104. The PIN may be provided to the authorization center for comparison with a correlative PIN stored on the issuer system. Alternatively, the PIN may be provided to fob 102 via RFID reader 104. Fob 102 may verify the PIN by comparing the PIN to a correlative PIN stored on, for example, secure memory 212.

Where a verification PIN is used as secondary verification, the verification PIN may be checked for accuracy against a corroborating PIN which correlates to fob 102 transaction account number. The corroborating PIN may be stored locally (e.g., on fob 102), or may be stored on a database at the payment authorization center. The payment authorization center database may be any database maintained and operated by fob 102 transaction account provider.

The verification PIN may be provided to POS device 110 using a conventional merchant (e.g., POS) PIN key pad 118 in communication with POS device 110 as shown in FIG. 1, or an RFID keypad in communication with RFID reader 104. PIN keypad may be in communication with POS device 110 (or alternatively, RFID reader 104) using any conventional data link described above. Upon receiving the verification PIN, RFID reader 104 may seek to match the PIN to the corroborating PIN stored on RFID reader 104 at database 310 or 320. Alternatively, the verification PIN may be provided to a payment authorization center to determine whether the PIN matches the PIN stored on the payment authorization center database which correlates to fob 102 account. If a match is made, the purchase may no longer be restricted, and the transaction may be allowed to be completed.

Figure 9A:
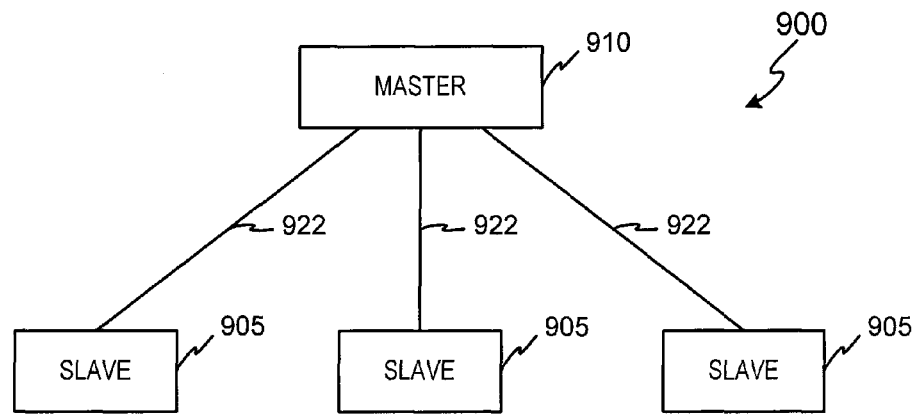
FIGS. 9A and 9B illustrate exemplary networks that comprise host readers communicating with secondary readers.
Figure 9B:
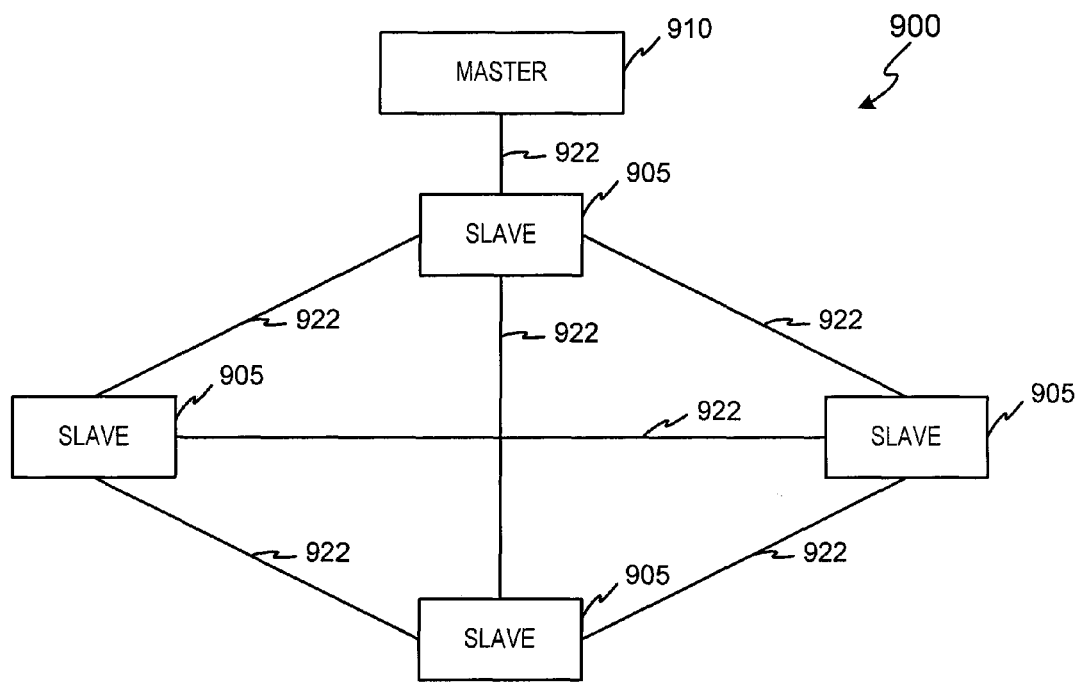

With reference to an exemplary block diagram illustrated in FIGS. 9A and 9B, the invention may comprise a network 900 of wireless RF readers configured to communicate with a host reader 910. That is, one or more RF readers may be configured as "secondary" readers 905 that facilitate communication with host reader 910 via one or more data links 922. Host reader/master reader 910 is configured similarly to RFID reader 104 (as depicted in FIG. 1A)

Secondary reader 905 may also be configured similarly to RFID reader 104 to transmit and/or receive information to/from host reader 910, fob 102 user or any other component. Each secondary reader 905 may be configured to be controlled by one or more host readers 910 or other secondary readers 905. Each secondary reader 905 may be configured to communicate with other secondary readers 905 directly or through one or more host readers 910. In one embodiment, host reader 910 may be configured to facilitate the transfer and communication from one secondary reader 905 to another without secondary readers 905 ever being aware of one another.

As one of the advantages of secondary readers 905 of the present invention surrounds its simplicity and hence low cost, it may be desirable in certain applications to limit the hardware associated with secondary reader 905 to only that hardware minimally necessary to effectively interface with the user and to communicate with host RFID reader 910.

Host reader 910 may be configured as an RFID reader for controlling all or any portion of data traffic in network 900. For example, each secondary reader 905 may communicate and/or transmit information to host reader 910. In one embodiment, all or any subset of secondary readers 905 may communicate and/or transmit with host reader 910 in a star network topology to facilitate bandwidth usage.

For example, in existing POS configurations, a consumer must approach a specific POS terminal to perform a transaction. However, in the present invention, any secondary reader 905 and/or host reader 910 may be used to perform a transaction. That is, secondary reader 905 and/or host reader 910 can function as POS terminals themselves. Further still, the information communicated between host reader 910, secondary reader 905 and/or any other component within network 900 may be safeguarded by one or more specific radio-frequency protocols. For more information on securing RF transactions, see U.S. patent application Ser. No. 10/708,569 entitled "SYSTEM AND METHOD FOR SECURING SENSITIVE INFORMATION DURING COMPLETION OF A TRANSACTION," filed Mar. 11, 2004; U.S. patent application Ser. No. 10/708,547 entitled "SYSTEM AND METHOD FOR SECURING RF TRANSACTIONS USING A RADIO FREQUENCY IDENTIFICATION DEVICE INCLUDING A RANDOM NUMBER GENERATOR," filed Mar. 10, 2004; U.S. patent application Ser. No. 10/708,545 entitled "SYSTEM AND METHOD FOR SECURING RF TRANSACTIONS USING A RADIO FREQUENCY IDENTIFICATION DEVICE INCLUDING A TRANSACTIONS COUNTER," filed Mar. 10, 2004; and U.S. patent application Ser. No. 10/711,720 entitled "SYSTEMS AND METHODS FOR MANAGING MULTIPLE ACCOUNTS ON A RF TRANSACTION DEVICE USING SECONDARY IDENTIFICATION INDICIA," filed Sep. 30, 2004, all of which are incorporated herein by reference.

Data links 922 may be configured in a manner similar to data links 120, 122, 124, and 128 described above, for example, data links 922 may include an Internet Service Provider (ISP) configured to facilitate communications over a local loop as is typically used in connection with standard modem communication, cable modem, dish networks, ISDN, Digital Subscriber Lines (DSL), or any wireless communication media. In an exemplary embodiment, data links 922 may be configured as radio frequency links in a wireless network system.

For example, FIG. 9A illustrates an exemplary network 900 that comprises a single host reader 910 communicating with three secondary readers 905. Host reader 910 may be configured to substantially control the timing, information, communication and other aspects of each secondary reader 905. Each host reader 910 may be configured to transmit and/or receive information directly and/or indirectly from fob 102, transponder 114, network 136, and/or any part of merchant system 130.

In another embodiment, FIG. 9B illustrates a network 900 that comprises host reader 910 in communication with four secondary readers 905. Each secondary reader 905 may be configured to communicate with one another directly. In addition and/or alternatively, each secondary reader 905 may communicate with one another through host reader 910 and/or each secondary reader 905 may be configured to transmit and/or receive information directly and/or indirectly from fob 102, transponder 114, network 136, and/or any part of merchant system 130.

While FIGS. 9A and 9B illustrate a single host reader 910, network 900 may comprise multiple host readers 910 and secondary readers 905. For example, where network 900 comprises two or more host readers 910, each host reader 910 may be configured with a different clock and/or other feature to allow for multiple host readers 910 to communicate on the same network 900. Further, while three or four secondary readers 905 are depicted in communication with host reader 910, any number of secondary readers 905 may communicate with any number of host readers 910.

In another exemplary embodiment, host reader 910 and one or more secondary readers 905 may be configured to operate as the other type of reader. In other words, host reader 910 may be configured to function as if it were a secondary reader, while secondary reader 905 may be configured to function as if it were a host reader. In yet another exemplary embodiment, host reader 910 may be configured to function as a host reader on network 900 and as a secondary reader on a different network.

Figure 10:
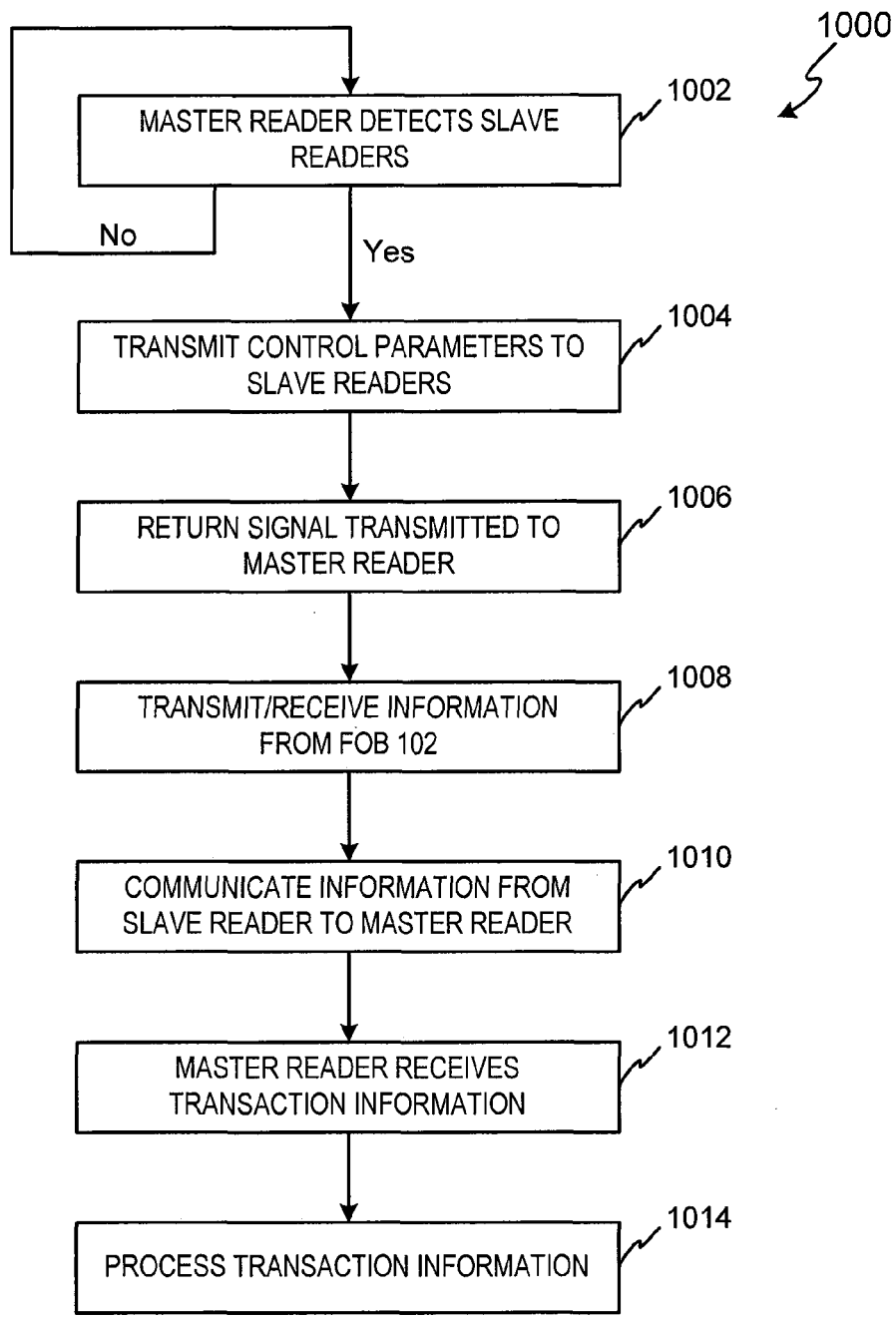
FIG. 10 illustrates an exemplary method for facilitating a transaction using a host/secondary reader network.

FIG. 10 illustrates an exemplary method for facilitating a transaction using host/secondary reader network 900. First, host reader 910 may test whether any secondary readers 905 are in communication with host reader 910 (step 1002). If no secondary readers 905 are detected, host reader 910 may be configured to retest the system (step 1002). If one or more secondary readers 905 are detected, host reader 910 may be configured to transmit one or more control parameters to secondary readers 905 (step 1004). Control parameters may include, for example, initialization information, network information, counter information, timing information, transaction information, authorization information, and the like. Such control parameter information includes, for example, a synchronization time channel, transaction counter, transaction card data, a message authentication code and/or the like. Secondary readers 905 may additionally be configured to transmit a return signal and/or other communication to host reader 910 to verify that secondary readers 905 received host reader 910 information and/or have been initialized (step 1006). Next, one or more secondary readers 905 and/or host reader 910 may transmit and/or receive transaction information from one or more fobs 102 (step 1008). By transmitting and/or receiving transaction information, secondary readers 905 and/or host reader 910 may authenticate fob 102 (see steps 402-414, supra), utilize a decision process (steps 502-524, supra), engage in a personalization process (steps 602-632 and/or 702-732, supra), and/or otherwise engage in a transaction as illustrated in exemplary steps 802-832.

After and/or while one or more secondary readers 905 are transmitting and/or receiving transaction information, one or more secondary readers 905 may communicate this information to host reader 910 (step 1010). By communicating this information to host reader 910, one or more secondary readers 905 may communicate with host reader 910 using RF communications protocols, as described herein, over network 900. Secondary reader 905 may transmit the information in real time, over any delayed time period and/or in batch time. For example, secondary reader 905 may be configured to transmit transaction information as soon as it is received from fob 102. In another embodiment, secondary reader 905 may be configured to transmit information from multiple transactions in preset time intervals (i.e., every hour, day, etc.).

When secondary reader 905 transmits information in real time, it is not necessary for secondary reader 905 to store batch data locally, since host reader 910 has an essentially real time record of the day's transactions. Thus, secondary reader 905 may be configured to merely reconcile with host reader 910 to account for any discrepancies which may have occurred, for example due to an error in transmission of a message from host reader 910 to secondary reader 905 or vice versa.

In another embodiment, secondary reader 905 may be configured to transmit information to host reader 910 using a shadow file system scheme. In a shadow file system, a host reader 910 capture system is employed, as well as a secondary reader 905 capture system. At the end of the day, if the totals match, there is no need to reconcile via a batch processing scheme. If, on the other hand, a discrepancy is noted at the time of reconciliation, the "backup" secondary reader 905 capture system may be used to effect a batch processing reconciliation.

In yet another embodiment, secondary reader 905 may be configured to transmit information to host reader 910 using a hybrid system, wherein secondary reader 905 may obtain authorization from a first host reader 910, yet secondary reader 905 may additionally be configured to effect various transactions from one or more different host readers 910. Further still, secondary reader 905 may be configured to reconcile with any one of the foregoing host readers 910 or even with yet a different host reader 910, as desired.

Host reader 910 may be configured to receive the transaction information (step 1012) and may be configured to facilitate processing the transaction information (step 1014). In one embodiment, host reader 910 may be configured to process the transaction information even if host reader 910 has not yet received all of the transaction information. By processing the transaction information, host reader 910 may be configured to decrypt one or more account numbers and convert the account numbers into magnetic stripe (ISO/IEC 7813) format (step 822, supra) and to provide one or more unencrypted account numbers to the merchant system 130 by providing the numbers to POS 110 device for transmission to the merchant network 112 for processing (step 828, supra). Host reader 910 may additionally be configured to process the transaction consistent with any other transaction processing systems known in the art.

For example, in one embodiment, a restaurant may be configured with secondary readers 905 at each table at the restaurant. The restaurant may include electronic menus at each table (e.g., for self selection of menu items), wherein the electronic menus may communicate with secondary reader 905 for payment processing. The implementation, earning and/or redemption of any coupons, promotions, loyalty points or discounts may also be facilitated through the electronic menu and/or secondary reader 905. The electronic menus may also send order information to the kitchen staff to facilitate preparation of the correct menu. The electronic menu may also include a verification screen to allow the customers to verify the complete or any portion of the order. The electronic menu may also provide scents or pictures of the menu items and allow the consumer to custom order any item (e.g., type of cooking style, spices, side dishes, etc). Entry of the custom order may alter the picture of the menu item to display the specific custom order. Further still, electronic menus may be used to communicate information about the bill and/or cost of a meal. For example, upon finishing a meal, a user may use an electronic menu to calculate the bill and/or any tax and/or tip information. The electronic menus may be configured to communicate this bill information to secondary reader 905 and/or master reader 910 via wireless link 922 and/or via 120, 122, 124, and 128 described above.

Each secondary reader 905 may be configured to communicate bill information, transaction information and/or any other information with host reader 910, via wireless link 922. For example, each secondary reader 905 may be configured to transmit and/or receive transaction information, including payment information, bill information, and the like. In one embodiment, secondary reader 905 may be configured to transmit and/or receive transaction information after an electronic menu has displayed billing information. Alternatively, secondary reader 905 may be configured to be activated to transmit and/or receive transaction information at any certain time (i.e., when the bill is presented to the customer, during the meal, etc.). By the term "activated," secondary reader 905 may be manually or automatically turned on, secondary reader 905 may receive control parameter information from host reader 910, or the like. For example, secondary reader 905 may be configured to interrogate a transponder only after secondary reader 905 receives authorization from host reader 910.

Secondary reader 905 may then communicate the transaction information to host reader 910 for processing. For example, host reader 910 may be configured to communicate with a merchant, issuer and/or one or more third parties to facilitate transaction payment, settlement, processing and the like. Host reader 910 may be configured to communicate the transaction information in real time, batch time, and/or at any other timing interval.

Host reader 910 may also be configured to communicate transaction acknowledgement information to secondary reader 905. For example, if a merchant denies payment information, host reader 910 may be configured to communicate this denial to secondary reader 905 and/or to an electronic menu.

In another embodiment, each entrance/exit to a commercial establishment, for example, may be configured with a secondary reader 905 to facilitate expedited transaction completion. That is, when a fob 102 user exits the establishment, transaction information may be communicated from fob 102 user to secondary reader 905 for transaction completion. This transaction information may include payment information as well as information detected from one or more RFID tags coupled to fob 102 user's desired purchase. For example, in a grocery store, each grocery item may have an RFID tag affixed to it. When fob 102 user finishes shopping, fob 102 user may simply push his cart containing the RFID-tagged goods through the exit of the store. Secondary reader 905, configured adjacent to the exit, may be configured to interrogate each grocery item (using the item's RFID tag) as well as fob 102 to obtain transaction information. This transaction information may be further communicated to host reader 910 in the form of a transaction request. Host reader 910 may, in turn, be configured to facilitate further processing of this transaction request. A similar system may be established at any other location within the store (e.g., at the end of each aisle) such that the fob user may obtain a subtotal of items as the user is shopping.

Secondary reader 905 and/or host reader 910 may be additionally configured with one or more user interfaces, as described herein, to facilitate communicating transaction information to/from a user, another secondary reader 905 and/or host reader 910. In one embodiment, secondary reader 905 may be configured with a keypad to prompt and facilitate a fob user 102 to enter a PIN and/or any other secondary identifier.

In yet another embodiment, secondary reader 905 and/or host reader 910 may be configured with one or more biometric security systems to facilitate a transaction. For example, a fob 102 user may submit any form of secondary identification, such as, for example, a personal identification number (PIN), biometric identifier, voice recognition technology, retinal recognition technology, or the like. The secondary identifier may be provided to fob 102, secondary reader 905 and/or host reader 910, or the like, for transaction completion.

The biometric security system may include fob 102 and secondary reader 905 and/or host reader 910 communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof. For an explanation of systems and methods for providing a secondary form of identification for transaction completion, please see U.S. patent application Ser. No. 10/708,822, titled "SYSTEM FOR BIOMETRIC SECURITY USING A FOB," filed Mar. 26, 2004; U.S. patent application Ser. No. 10/708,823, titled "METHOD FOR BIOMETRIC SECURITY USING A TRANSPONDER," filed Mar. 26, 2004; U.S. patent application Ser. No. 10/708,823, titled "METHOD FOR BIOMETRIC SECURITY USING A TRANSPONDER," filed Mar. 26, 2004; U.S. patent application Ser. No. 10/708,824, titled "METHOD FOR BIOMETRIC SECURITY USING A TRANSPONDER-READER," filed Mar. 26, 2004; U.S. patent application Ser. No. 10/708,825, titled "METHOD AND SYSTEM FOR FINGERPRINT BIOMETRICS ON A FOB," filed Mar. 26, 2004; U.S. patent application Ser. No. 10/708,826, titled "METHOD AND SYSTEM FOR FACIAL RECOGNITION BIOMETRICS ON A FOB," filed Mar. 26, 2004; U.S. patent application Ser. No. 10/708,827, titled "METHOD AND SYSTEM FOR VOICE RECOGNITION BIOMETRICS ON A FOB," filed Mar. 26, 2004; U.S. patent application Ser. No. 10/708,828, titled "METHOD AND SYSTEM FOR SIGNATURE RECOGNITION BIOMETRICS ON A FOB," filed Mar. 26, 2004; U.S. patent application Ser. No. 10/708,829, titled "METHOD AND SYSTEM FOR VASCULAR PATTERN RECOGNITION BIOMETRICS ON A FOB," filed Mar. 26, 2004; U.S. patent application Ser. No. 10/708,830, titled "METHOD AND SYSTEM FOR DNA RECOGNITION BIOMETRICS ON A FOB," filed Mar. 26, 2004; U.S. patent application Ser. No. 10/708,831, titled "METHOD AND SYSTEM FOR HAND GEOMETRY RECOGNITION BIOMETRICS ON A FOB," filed Mar. 26, 2004; U.S. patent application Ser. No. 10/708,832, titled "METHOD AND SYSTEM FOR AUDITORY EMISSIONS RECOGNITION BIOMETRICS ON A FOB," filed Mar. 26, 2004; U.S. patent application Ser. No. 10/708,833, titled "METHOD AND SYSTEM FOR SMELLPRINT RECOGNITION BIOMETRICS ON A FOB," filed Mar. 26, 2004; U.S. patent application Ser. No. 10/708,834, titled "METHOD AND SYSTEM FOR KEYSTROKE SCAN RECOGNITION BIOMETRICS ON A FOB," filed Mar. 26, 2004; U.S. patent application Ser. No. 10/708,835, titled "METHOD AND SYSTEM FOR IRIS SCAN RECOGNITION BIOMETRICS ON A FOB," filed Mar. 26, 2004; U.S. patent application Ser. No. 10/708,836, titled "METHOD AND SYSTEM FOR RETINAL SCAN RECOGNITION BIOMETRICS ON A FOB," filed Mar. 26, 2004; U.S. patent application Ser. No. 10/708,837, titled "SYSTEM AND METHOD FOR PROFFERING MULTIPLE BIOMETRICS FOR USE WITH A FOB," filed Mar. 26, 2004; U.S. patent application Ser. No. 10/708,838, titled "SYSTEM FOR REGISTERING A BIOMETRIC FOR USE WITH A TRANSPONDER," filed Mar. 26, 2004; U.S. patent application Ser. No. 10/708,839, titled "METHOD FOR REGISTERING BIOMETRIC FOR USE WITH A FOB," filed Mar. 26, 2004; U.S. patent application Ser. No. 10/708,840, titled "METHOD FOR USING A SENSOR REGISTER A BIOMETRIC FOR USE WITH A TRANSPONDER-READER SYSTEM," filed Mar. 26, 2004; U.S. patent application Ser. No. 10/708,841, titled "BIOMETRIC SAFEGUARD FOR USE WITH A FOB," filed Mar. 26, 2004; all of which are herein incorporated by reference.

In yet another embodiment, network 900 may comprise one or more non-RFID secondary readers in wireless communication with a non-RFID host reader. By the term "non-RFID," a secondary and/or host reader may include any type of reader, such as, for example a traditional magnetic stripe reader, a smartcard reader, a loyalty card reader, a proximity card reader, and the like. Each host non-RFID reader may communicate with one or more secondary readers through a wireless communication link. The wireless communication links may be similar to link 922 and/or to data links 120, 122, 124, and 128 described above.

The preceding detailed description of exemplary embodiments of the invention makes reference to the accompanying drawings, which show the exemplary embodiments by way of illustration. While these exemplary embodiments are described in sufficient detail to enable those skilled in the art to practice the invention, it should be understood that other embodiments may be realized and that logical and mechanical changes may be made without departing from the spirit and scope of the invention. For example, the steps recited in any of the method or process claims may be executed in any order and are not limited to the order presented. Further, the present invention may be practiced using one or more servers, as necessary. Thus, the preceding detailed description is presented for purposes of illustration only and not of limitation, and the scope of the invention is defined by the preceding description, and with respect to the attached claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variations thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

What is claimed is:

1. A Radio Frequency Identification (RFID) reader grid comprising:
   a secondary RFID reader configured to communicate with a first Radio Frequency (RF) payment fob associated with a first fob user, wherein said secondary RFID reader is configured to receive a first transaction request from said first RF payment fob; and
   a host RFID reader configured to communicate with said secondary RFID reader via a wireless signal, wherein said host RFID reader is configured to receive said first transaction request from said secondary RFID reader and transmit a transaction request response to said secondary RFID reader, and wherein said host RFID reader is further configured to receive a second transaction request directly from a second RF payment fob associated with a second fob user, while said host RFID reader communicates with said secondary RFID reader.

2. The RFID reader grid of claim 1, wherein the functionality of said host RFID reader is similar to the functionality of said secondary RFID reader.

3. The RFID reader grid of claim 1, wherein said secondary RFID reader and said host RFID reader are configured to communicate transaction information.

4. The RFID reader grid of claim 1, wherein RFID reader grid is configured with multiple secondary RFID readers.

5. The RFID reader grid of claim 3, wherein said transaction information is in Track 1/Track 2 format.

6. The RFID reader grid of claim 3, wherein said transaction information includes at least one of a transponder identifier, a merchant identifier, RFID reader information, an authentication code, or secondary identifier information.

7. The RFID reader grid of claim 1, wherein at least one of said secondary RFID reader or said host RFID reader comprises a biometric system.

8. The RFID reader grid of claim 7, wherein said biometric system comprises a means for recognizing a portion of at least one of a voiceprint, fingerprint, facial feature, ear feature, vascular pattern, DNA, hand geometry, sound reception, smell, iris feature, or retinal feature.

9. The RFID reader grid of claim 3, wherein said transaction information comprises said first transaction request.

10. The RFID reader grid of claim 1, wherein said secondary RFID reader is configured to receive control parameter information from said host RFID reader.

11. The RFID reader grid of claim 10, wherein said control parameter information includes at least one of initialization information, network information, timing information, transponder information, counter information or transaction information.

12. A method comprising:
    receiving, from a first Radio Frequency (RF) payment fob associated with a first fob user, a first transaction request at a secondary Radio Frequency Identification (RFID) reader of an RFID reader grid;
    communicating said first transaction request to a host RFID reader of said RFID reader grid via a wireless signal, wherein said host RFID reader transmits a transaction request response to said secondary RFID reader; and
    during said communicating said first transaction request to said host RFID reader, receiving, at said host RFID reader, a second transaction request directly from a second RF payment fob associated with a second fob user.

13. A tangible computer-readable medium having stored thereon computer-executable instructions that, if executed by a system, cause the system to perform a method comprising:
    receiving, from a first Radio Frequency (RF) payment fob associated with a first fob user, a first transaction request at a secondary Radio Frequency Identification (RFID) reader of an RFID reader grid;
    communicating said first transaction request to a host RFID reader of said RFID reader grid via a wireless signal, wherein said host RFID reader transmits a transaction request response to said secondary RFID reader; and
    during said communicating said first transaction request to said host RFID reader, receiving, at said host RFID reader, a second transaction request directly from a second RF payment fob associated with a second fob user.

14. The RFID reader grid of claim 1, wherein said secondary RFID reader comprises a contact-based reader.

15. The RFID reader grid of claim 1, wherein said wireless signal is at least one of an infrared light signal, a laser light signal, a visible light signal, or an acoustic energy signal.

16. The method of claim 12, further comprising detecting a presence of said secondary RFID reader.

17. The method of claim 12, further comprising communicating control parameter information from said host RFID reader to said secondary RFID reader, wherein said control parameter information comprises at least one of network information, counter information, timing information, transaction information, or authorization information.

18. The RFID reader grid of claim 10, wherein said control parameter information comprises a protocol, initialization information, network information, timing information, transponder information, counter information and transaction information.

19. The RFID reader grid of claim 12, further comprising a second host RFID reader, wherein said host RFID reader operates at a first clock speed and said second host RFID reader operates at a second clock speed to facilitate said host RFID reader and said second host RFID reader communicating on a same network.

20. The method of claim 12, further comprising receiving, at said host RFID reader, and during said communicating said first transaction request to said host RFID reader, a third transaction request from an additional secondary RFID reader at said host RFID reader, wherein said additional secondary RFID reader receives said third transaction request from a third RF payment fob associated with a third fob user.

21. The method of claim 12, further comprising transmitting transaction information directly between said secondary RFID reader and an additional secondary RFID reader.

22. The method of claim 12, further comprising reading, by said secondary RFID reader, an RFID tag affixed to an item, wherein said first transaction request includes first information associated with said first RF payment fob, and wherein said first transaction request further includes second information associated with said RFID tag and said item.

23. The method of claim 12, further comprising decrypting, by said host RFID reader, an encrypted account number communicated from said first RF payment fob to create a decrypted account number, wherein said first transaction request includes said encrypted account number.

24. The method of claim 23, further comprising converting said decrypted account number into magnetic stripe format to create a magnetic stripe formatted account number, and transmitting said magnetic stripe formatted account number to a point of sale device for processing.

25. The method of claim 12, wherein said communicating said first transaction request to said host RFID reader comprises communicating said first transaction request through said host RFID reader to a point of sale device.

26. The method of claim 12, wherein said first transaction request comprises account information and payment information associated with said first RF payment fob.

* * * * *